(12) United States Patent
Ono et al.

(10) Patent No.: US 11,258,468 B2
(45) Date of Patent: Feb. 22, 2022

(54) RADIO FREQUENCY CIRCUIT AND COMMUNICATION DEVICE

(71) Applicant: Murata Manufacturing Co., Ltd., Kyoto (JP)

(72) Inventors: Atsushi Ono, Nagaokakyo (JP); Satoshi Tanaka, Nagaokakyo (JP); Hirotsugu Mori, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/926,275

(22) Filed: Jul. 10, 2020

(65) Prior Publication Data

US 2021/0013909 A1 Jan. 14, 2021

(30) Foreign Application Priority Data

Jul. 11, 2019 (JP) .............................. JP2019-129004

(51) Int. Cl.
  *H04B 1/00* (2006.01)
  *H04B 1/40* (2015.01)
(52) U.S. Cl.
  CPC ............ *H04B 1/0067* (2013.01); *H04B 1/40* (2013.01)
(58) Field of Classification Search
  CPC .................................. H04B 1/0067; H04B 1/40
  See application file for complete search history.

(56) References Cited

U.S. PATENT DOCUMENTS

| | | | | |
|---|---|---|---|---|
| 10,420,161 | B1 * | 9/2019 | Sava | H04W 76/15 |
| 10,440,665 | B1 * | 10/2019 | Witherell | H04W 24/08 |
| 10,505,700 | B1 * | 12/2019 | Lan | H04B 1/525 |
| 2016/0127015 | A1 | 5/2016 | Wloczysiak et al. | |
| 2017/0316233 | A1 * | 11/2017 | Kherani | H04W 4/021 |
| 2019/0158137 | A1 * | 5/2019 | Brunel | H04B 1/04 |
| 2019/0223114 | A1 * | 7/2019 | Kwok | H04W 52/30 |

FOREIGN PATENT DOCUMENTS

JP 2018-33121 A 3/2018

OTHER PUBLICATIONS

Verizon, Ericsson, Qualcomm, Samsung, Nokia, TP for TR 37.716-11-11 NR Inter-band DC 13-n26x band combination, 3GPP TSG-RAN WG4 Meeting #90, R4-1900411, Feb. 25-Mar. 1, 2019, pp. 1-10, 3GPP, Athens, Greece.

\* cited by examiner

*Primary Examiner* — Nguyen T Vo
(74) *Attorney, Agent, or Firm* — Pearne & Gordon LLP

(57) ABSTRACT

A radio frequency circuit can transfer radio frequency signals used in first and second communication systems, and includes: a first transfer circuit that transfers a radio frequency signal having a frequency range in a first communication band having first transmission and receiving bands; and a second transfer circuit that transfers a radio frequency signal having a frequency range in a second communication band having second transmission and receiving bands. The radio frequency circuit can simultaneously transmit transmission signals having frequency ranges in the first and second communication bands using the first and second transfer circuits. The first receiving band is lower than the first transmission band, the first transmission band is lower than the second transmission band, and the second transmission band is lower than the second receiving band. The first and second transfer circuits are mounted on different mounting boards.

14 Claims, 8 Drawing Sheets

RADIO FREQUENCY CIRCUIT AND COMMUNICATION DEVICE

CROSS REFERENCE TO RELATED APPLICATION

The present application is based on and claims priority of Japanese Patent Application No. 2019-129004 filed on Jul. 11, 2019. The entire disclosure of the above-identified application, including the specification, drawings and claims is incorporated herein by reference in its entirety.

BACKGROUND

The present disclosure relates to a radio frequency circuit and a communication device that includes the radio frequency circuit.

There has been a demand that a radio frequency front-end circuit support multiband and multi-mode technology to simultaneously transfer a plurality of radio frequency signals with low loss.

U.S. Unexamined Patent Application Publication No. 2016/0127015 discloses a receiving module (a transfer circuit) having a configuration in which a plurality of filters having different passbands are connected to an antenna via a multiplexer.

BRIEF SUMMARY

The receiving module (the transfer circuit) described in U.S. Unexamined Patent Application Publication No. 2016/0127015 can simultaneously transfer radio frequency signals having frequency ranges in communication bands in a single communication system. In this regard, in recent years, there has been a demand for simultaneous transfer of radio frequency signals used in several different communication systems (for example, the fourth generation mobile communication system and the fifth generation mobile communication system). Furthermore, as a combination of two communication bands when radio frequency signals used in different communication systems are simultaneously transferred, an example is proposed in which a lower-frequency 4G communication band has a receiving band and a transmission band that is higher than the receiving band, whereas a higher-frequency 5G communication band has a transmission band and a receiving band that is higher than the transmission band.

However, when a single transfer circuit simultaneously transmits radio frequency signals having frequency ranges in such two communication bands whose transmission bands are adjacent to each other, isolation between the signals deteriorates, which leads to a problem that intermodulation distortion occurs.

In view of the above, the present disclosure is to address such problems, and is to provide a radio frequency circuit and a communication device that reduce intermodulation distortion when radio frequency signals used in a plurality of communication systems are simultaneously transmitted.

In order to provide such a radio frequency circuit, a radio frequency circuit according to an aspect of the present disclosure is a radio frequency circuit configured to transfer a radio frequency signal used in a first communication system, and a radio frequency signal used in a second communication system different from the first communication system, the radio frequency circuit including: a first transfer circuit configured to transfer a radio frequency signal having a frequency range in a first communication band, the first communication band having a first transmission band and a first receiving band; and a second transfer circuit configured to transfer a radio frequency signal having a frequency range in a second communication band, the second communication band having a second transmission band and a second receiving band. The radio frequency circuit is configured to simultaneously transmit a transmission signal having a frequency range in the first communication band using the first transfer circuit, and a transmission signal having a frequency range in the second communication band using the second transfer circuit, the first communication band being in one communication system out of the first communication system and the second communication system, the second communication band being in another communication system out of the first communication system and the second communication system, the first receiving band is lower than the first transmission band, the first transmission band is lower than the second transmission band, the second transmission band is lower than the second receiving band, and the first transfer circuit and the second transfer circuit are mounted on different mounting boards.

According to the present disclosure, a radio frequency circuit and a communication device can be provided which reduce intermodulation distortion when radio frequency signals used in a plurality of communication systems are simultaneously transmitted.

BRIEF DESCRIPTION OF DRAWINGS

These and other advantages and features will become apparent from the following description thereof taken in conjunction with the accompanying Drawings, by way of non-limiting examples of embodiments disclosed herein.

DETAILED DESCRIPTION

Figure 1:
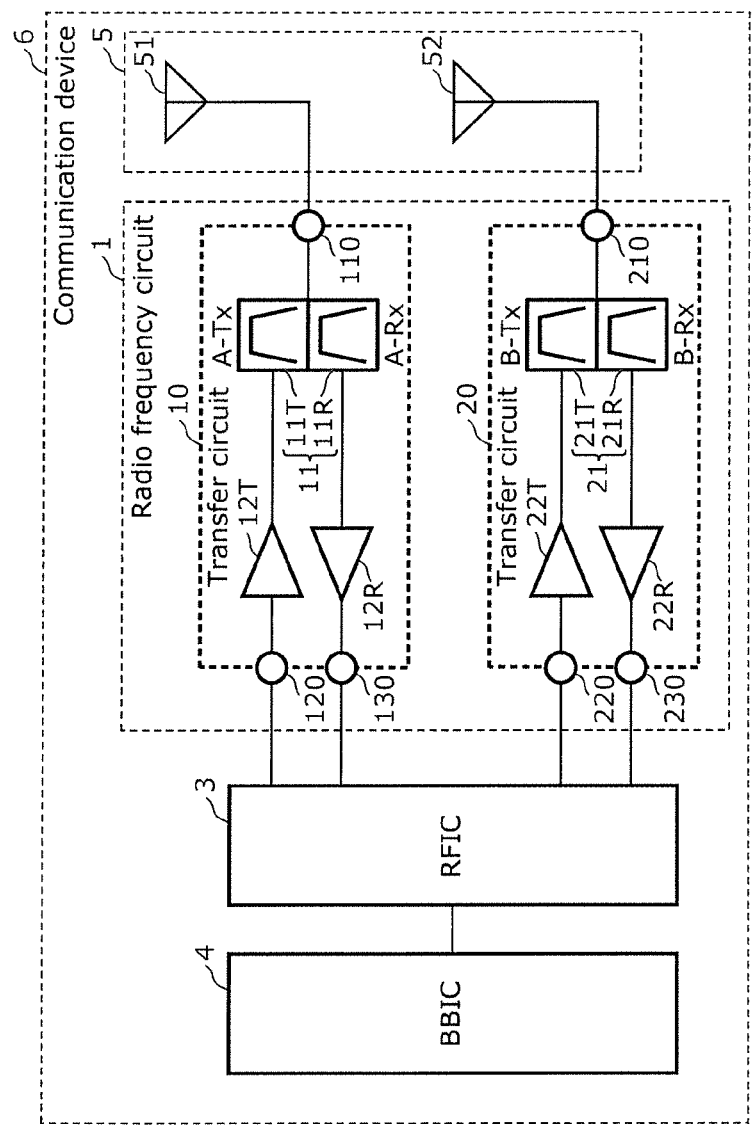
FIG. 1 illustrates a circuit configuration of a radio frequency circuit and a communication device according to an embodiment.

The following describes in detail embodiments of the present disclosure, with reference to examples and drawings. Note that the embodiments described below each show a general or specific example. The numerical values, shapes, materials, elements, and the arrangement and connection of the elements, for instance, described in the following embodiment are examples, and thus are not intended to limit the present disclosure. Among the elements in the following embodiment, elements not recited in any of the independent claims are described as arbitrary elements. Furthermore, the sizes and the ratios of the sizes of elements illustrated in the drawings are not necessarily accurate.

1 Configuration of Radio Frequency Circuit 1 and Communication Device 6

FIG. 1 illustrates a circuit configuration of radio frequency circuit 1 and communication device 6 according to an embodiment. As illustrated in FIG. 1, communication device 6 includes radio frequency circuit 1, antenna circuit 5, radio frequency (RF) signal processing circuit (RF integrated circuit (IC)) 3, and baseband signal processing circuit (BBIC) 4.

Radio frequency circuit 1 includes transfer circuits 10 and 20.

Transfer circuit 10 is an example of a first transfer circuit, and transfers radio frequency signals having frequency ranges in communication band A (a first communication band). Transfer circuit 10 includes transmission reception terminal 110 (a first terminal), transmission input terminal 120, reception output terminal 130, duplexer 11, power amplifier 12T, and low noise amplifier 12R.

Duplexer 11 allows radio frequency signals having frequency ranges in communication band A to pass through. Duplexer 11 includes transmission filter 11T and receiving filter 11R. The output terminal of transmission filter 11T and the input terminal of receiving filter 11R are connected to transmission reception terminal 110, the input terminal of transmission filter 11T is connected to the output terminal of power amplifier 12T, and the output terminal of receiving filter 11R is connected to the input terminal of low noise amplifier 12R. Transmission filter 11T has a passband that is a transmission band (a first transmission band) of communication band A, and receiving filter 11R has a passband that is a reception band (a first reception band) of communication band A.

Power amplifier 12T is an example of a first power amplifier, and amplifies a radio frequency transmission signal (hereinafter, referred to as a transmission signal) input through transmission input terminal 120 and having a frequency range in the transmission band of communication band A. Power amplifier 12T is connected between transmission input terminal 120 and the input terminal of transmission filter 11T.

Low noise amplifier 12R amplifies a radio frequency reception signal (hereafter referred to as a reception signal) input through transmission reception terminal 110, and having a frequency range in the reception band of communication band A. Low noise amplifier 12R is connected between the output terminal of receiving filter 11R and reception output terminal 130.

According to the above configuration of transfer circuit 10, a transmission signal amplified by power amplifier 12T passes through transmission filter 11T and is output through transmission reception terminal 110. A reception signal input through transmission reception terminal 110 and passing through receiving filter 11R is amplified by low noise amplifier 12R, and is output through reception output terminal 130. Thus, transfer circuit 10 transmits and receives radio frequency signals having frequency ranges in communication band A by frequency division duplex (FDD).

Power amplifier 12T and low noise amplifier 12R include, for instance, field effect transistors (FETs) or hetero bipolar transistors (HBTs) made of Si-based complementary metal oxide semiconductors (CMOSs) or GaAs, for example.

In transfer circuit 10, low noise amplifier 12R may be formed in a semiconductor IC. In addition, the semiconductor IC may further include power amplifier 12T. The semiconductor IC includes a CMOS, for example. Specifically, the semiconductor IC is formed by the silicon on insulator (SOI) process. Accordingly, the semiconductor IC can be manufactured at a low cost. Note that the semiconductor IC may include at least one of GaAs, SiGe, or GaN. Accordingly, a radio frequency signal having high amplification quality and high noise quality can be output.

Here, transmission reception terminal 110, transmission input terminal 120, reception output terminal 130, duplexer 11, power amplifier 12T, and low noise amplifier 12R that are included in transfer circuit 10 may be mounted on the same mounting substrate.

Transfer circuit 20 is an example of a second transfer circuit, and transfers a radio frequency signal having a frequency range in communication band B (a second communication band). Transfer circuit 20 includes transmission reception terminal 210 (a second terminal), transmission input terminal 220, reception output terminal 230, duplexer 21, power amplifier 22T, and low noise amplifier 22R.

Duplexer 21 allows radio frequency signals having frequency ranges in communication band B to pass through. Duplexer 21 includes transmission filter 21T and receiving filter 21R. The output terminal of transmission filter 21T and the input terminal of receiving filter 21R are connected to transmission reception terminal 210, the input terminal of transmission filter 21T is connected to the output terminal of power amplifier 22T, and the output terminal of receiving filter 21R is connected to the input terminal of low noise amplifier 22R. Transmission filter 21T has a passband that is the transmission band (a second transmission band) of communication band B, and receiving filter 21R has a passband that is the reception band (a second reception band) of communication band B.

Power amplifier 22T is an example of a second power amplifier, and amplifies a transmission signal input through transmission input terminal 220 and having a frequency range in the transmission band of communication band B. Power amplifier 22T is connected between transmission input terminal 220 and the input terminal of transmission filter 21T.

Low noise amplifier 22R amplifies a reception signal input through transmission reception terminal 210 and having a frequency range in the reception band of communication band B. Low noise amplifier 22R is connected between the output terminal of receiving filter 21R and reception output terminal 230.

According to the above-described configuration of transfer circuit 20, a transmission signal amplified by power amplifier 22T passes through transmission filter 21T, and is output through transmission reception terminal 210. A reception signal input through transmission reception terminal 210 and passing through receiving filter 21R is amplified by low noise amplifier 22R, and is output through reception output terminal 230. Thus, transfer circuit 20 transmits and receives radio frequency signals having frequency ranges in communication band B by FDD.

Power amplifier 22T and low noise amplifier 22R include, for instance, FETs or HBTs made of Si-based CMOSs or GaAs, for example.

Low noise amplifier 22R may be formed in a semiconductor IC in transfer circuit 20. In addition, the semiconductor IC may further include power amplifier 22T. The semiconductor IC includes a CMOS, for example. Specifically, the semiconductor IC is formed by the SOI process. Accordingly, the semiconductor IC can be manufactured at a low cost. Note that the semiconductor IC may include at least one of GaAs, SiGe, or GaN. Thus, a radio frequency signal having high amplification quality and high noise quality can be output.

Here, transmission reception terminal 210, transmission input terminal 220, reception output terminal 230, duplexer 21, power amplifier 22T, and low noise amplifier 22R that are included in transfer circuit 20 may be mounted on the same mounting board.

Here, in radio frequency circuit 1 according to the present embodiment, transfer circuit 10 and transfer circuit 20 are mounted on different mounting boards.

Radio frequency circuit 1 having the above configuration can transfer a radio frequency signal used in the first communication system, and a radio frequency signal used in the second communication system different from the first communication system. Note that the first communication system and the second communication system are in accordance with different communication standards, and the first communication system is, for example, the fourth generation mobile communication system (4G), whereas the second communication system is, for example, the fifth generation mobile communication system (5G).

A radio frequency signal used in the first communication system is a 4G signal as described above, and is a signal of a predetermined channel in a communication band used in Evolved Universal Terrestrial Radio Access (E-UTRA). Note that E-UTRA may be stated as Long Term Evolution (LTE) in the specification and the drawings. Note that the communication band is stated as a 4G-LTE communication band, for example.

A radio frequency signal used in the second communication system is, for example, a 5G signal as described above, and is a signal of a predetermined channel in a communication band used in New Radio (NR). Note that the communication band is stated as a 5G-NR communication band, for example.

Furthermore, radio frequency circuit 1 can simultaneously transmit a transmission signal having a frequency range in communication band A in the first communication system using transfer circuit 10, and a transmission signal having a frequency range in communication band B in the second communication system using transfer circuit 20. Further, radio frequency circuit 1 can simultaneously transmit a transmission signal having a frequency range in communication band A in the second communication system using transfer circuit 10, and a transmission signal having a frequency range in communication band B in the first communication system using transfer circuit 20.

Figure 2:
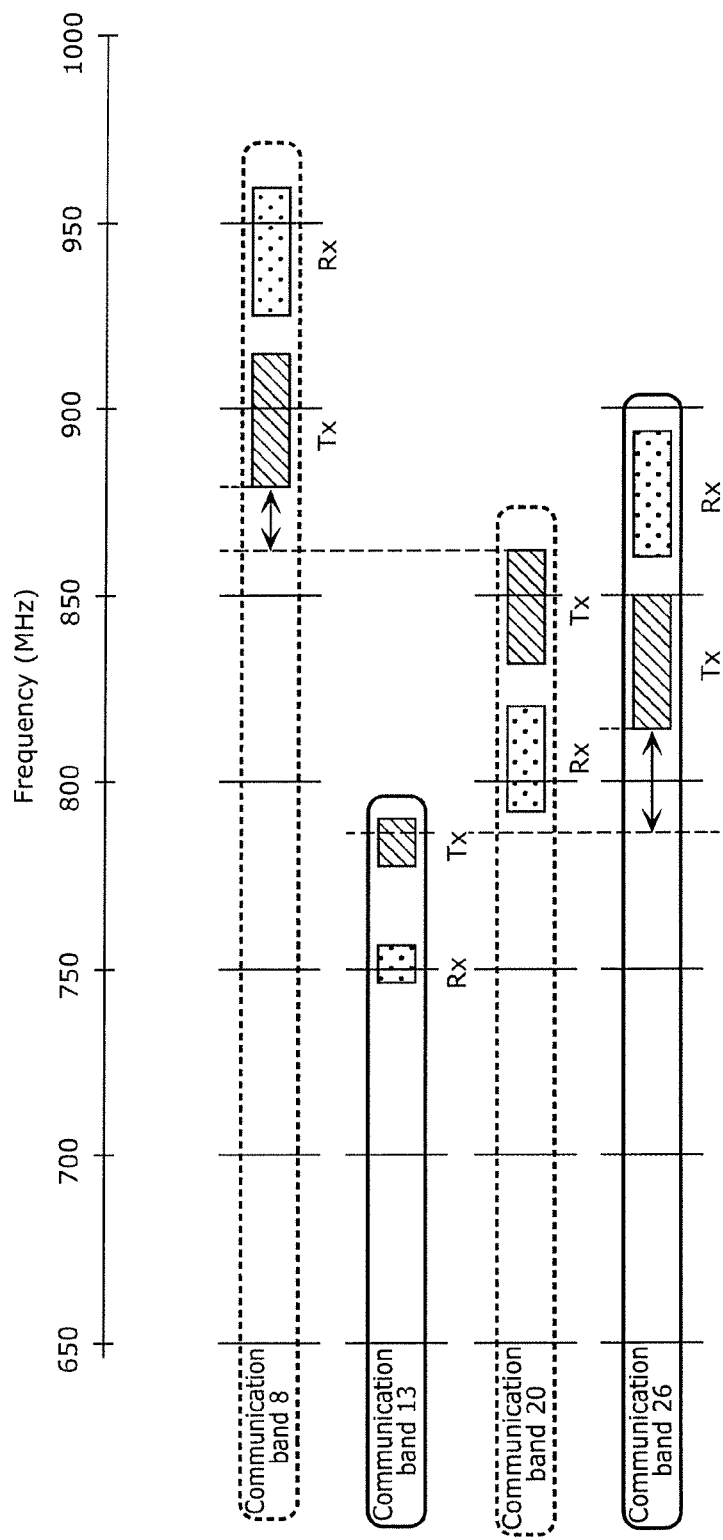
FIG. 2 illustrates a relation of frequency ranges of communication bands applied to the radio frequency circuit according to the embodiment.

FIG. 2 illustrates a relation of frequency ranges of communication bands applied to radio frequency circuit 1 according to the embodiment. FIG. 2 illustrates frequency ranges assigned to communication bands 8, 13, 20, and 26 applied to radio frequency circuit 1. As communication band 13 (having a transmission band from 777 MHz to 787 MHz, and a receiving band from 746 MHz to 756 MHz), for example, is applied to communication band A for transfer circuit 10 to transfer signals, and communication band 26 (having a transmission band from 814 MHz to 849 MHz, and a receiving band from 859 MHz to 894 MHz), for example, is applied to communication band B for transfer circuit 20 to transfer signals.

Here, the receiving band of communication band 13 is lower than the transmission band of communication band 13, the transmission band of communication band 13 is lower than the transmission band of communication band 26, and the transmission band of communication band 26 is lower than the receiving band of communication band 26. Stated differently, the transmission bands of communication bands 13 and 26 are adjacent to each other without a receiving band located therebetween. Accordingly, the transmission band of communication band 13 and the transmission band of communication band 26 have narrow frequency spacing (27 MHz).

Here, for example, if transfer circuit 10 transfers a transmission signal having a frequency range in 4G-LTE Band 13 (communication band 13) and transfer circuit 20 transfers a transmission signal having a frequency range in 5G-NR n26 (communication band 26), intermodulation distortion occurs when these two transmission signals are simultaneously output through transmission reception terminals 110 and 210. At this time, the frequency spacing between the two transmission signals is narrow, and thus, for example, the frequency at which third-order intermodulation distortion occurs may fall within the receiving band of communication band 13 or 26. In this case, the receiving sensitivity to a reception signal having a frequency range in communication band 13 or 26 decreases.

Note that in this description, the expression "the frequency at which intermodulation distortion occurs falls within frequency band A" is not limited to the case where frequencies at which intermodulation distortion occurs completely overlap frequency band A, but also encompasses the case where frequencies at which intermodulation distortion occurs partially overlap frequency band A.

In this regard, according to the configuration of radio frequency circuit 1 according to the present embodiment, a transmission signal having a frequency range in 4G-LTE Band 13 and a transmission signal having a frequency range in 5G-NR n26 are simultaneously transmitted by transfer circuits 10 and 20, respectively, which are mounted on different mounting boards. Accordingly, high isolation between the two transmission signals can be ensured, and thus such third-order intermodulation distortion can be reduced.

Note that in FIG. 1, duplexer 11 designed to ensure isolation between transmission filter 11T and receiving filter 11R is disposed in transfer circuit 10, and duplexer 21 designed to ensure isolation between transmission filter 21T and receiving filter 21R is disposed in transfer circuit 20. In contrast, transmission filter 11T and receiving filter 11R disposed in transfer circuit 10 may be single filters individually connected to transmission reception terminal 110, and transmission filter 21T and receiving filter 21R disposed in transfer circuit 20 may be single filters individually connected to transmission reception terminal 210. This can further improve isolation between such two transmission signals than radio frequency circuit 1 in which duplexers 11 and 21 are disposed.

Note that frequency $f_{IMD3}$ at which third-order intermodulation distortion occurs is represented by $(2 \times f2 - f1)$ or $(2 \times f1 - f2)$, where f1 denotes a frequency of a transmission signal transmitted by transfer circuit 10 in communication band A, and f2 denotes a frequency of a transmission signal transmitted by transfer circuit 20 in communication band B. Note that examples of a frequency at which intermodulation distortion occurs include (f1−f2) and (f2−f1) in addition to the above frequency at which third-order intermodulation distortion occurs, but the frequency is not limited thereto, and the examples also include frequencies defined by (m×f1±n×f2) and (m×f2±n×f1), where m and n are natural numbers.

In radio frequency circuit 1 according to the present embodiment, communication band 20 (having a transmission band from 832 MHz to 862 MHz, and a receiving band from 791 MHz to 821 MHz), for example, may be applied to communication band A for transfer circuit 10 to transfer signals, and communication band 8 (having a transmission band from 880 MHz to 915 MHz, and a receiving band from 925 MHz to 960 MHz), for example, may be applied to communication band B for transfer circuit 20 to transfer signals.

Here, the receiving band of communication band 20 is lower than the transmission band of communication band 20, the transmission band of communication band 20 is lower than the transmission band of communication band 8, and the transmission band of communication band 8 is lower than the receiving band of communication band 8. Accordingly, the transmission bands of communication bands 20 and 8 are adjacent to each other without a receiving band located therebetween. Thus, the transmission band of communication band 20 and the transmission band of communication band 8 has narrow frequency spacing (18 MHz).

Here, for example, if transfer circuit 10 transfers a transmission signal having a frequency range in 4G-LTE Band 20 (communication band 20) and transfer circuit 20 transfers a transmission signal having a frequency range in 5G-NR n8 (communication band 8), intermodulation distortion occurs when such two transmission signals are simultaneously output through transmission reception terminals 110 and 210. At this time, the frequency spacing between the two transmission signals is narrow, and thus, for example, the frequency at which third-order intermodulation distortion occurs may fall within the receiving band of communication band 20 or 8. In this case, the receiving sensitivity to a reception signal having a frequency range in communication band 20 or 8 decreases.

In this regard, according to the configuration of radio frequency circuit 1 according to the present embodiment, a transmission signal having a frequency range in 4G-LTE Band 20 and a transmission signal having a frequency range in 5G-NR n8 are simultaneously transmitted by transfer circuits 10 and 20, respectively, which are mounted on different mounting boards. Accordingly, high isolation between the two transmission signals can be ensured, and thus such third-order intermodulation distortion can be reduced.

The following describes elements of communication device 6 other than radio frequency circuit 1.

Antenna circuit 5 includes antennas 51 and 52. Antenna 51 is an example of a first antenna, is connected to transmission reception terminal 110, and radiates and receives radio frequency signals. Antenna 52 is an example of a second antenna, is connected to transmission reception terminal 210, and radiates and receives radio frequency signals.

Note that in radio frequency circuit 1 according to the present embodiment, transmission reception terminals 110 and 210 are connected to different antennas 51 and 52, respectively. Accordingly, a radio frequency signal having a frequency range in communication band A and output from transfer circuit 10 and a radio frequency signal having a frequency range in communication band B and output from transfer circuit 20 are radiated by different antennas. Thus, isolation between the two radio frequency signals can be improved, and consequently intermodulation distortion can be further reduced.

RFIC 3 is an RF signal processing circuit that processes radio frequency signals. Specifically, RFIC 3 processes transmission signals input from BBIC 4 by up-conversion, for instance, and outputs transmission signals generated by being processed to transfer circuits 10 and 20.

BBIC 4 is a circuit that processes signals using the intermediate frequency band lower than the frequency ranges of radio frequency signals transferred by transfer circuits 10 and 20. The signals processed by BBIC 4 are used as, for example, image signals for image display or audio signals for conversation through a speaker.

Note that antenna circuit 5 and BBIC 4 are not essential elements in communication device 6 according to the present embodiment.

2 Configuration of Radio Frequency Circuit 1A and Communication Device 6A According to Example 1

Figure 3:
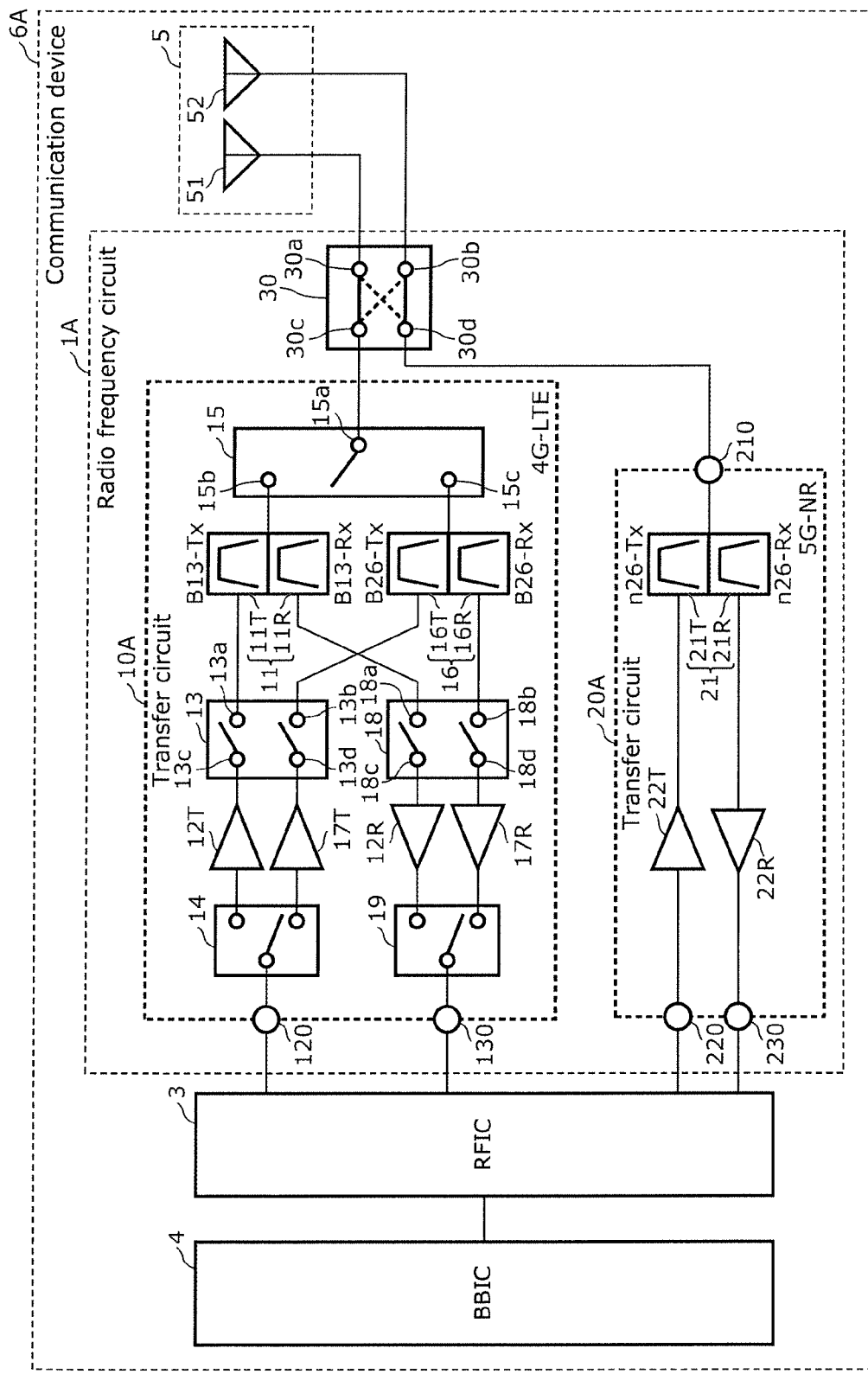
FIG. 3 illustrates a circuit configuration of a radio frequency circuit and a communication device according to Example 1.

FIG. 3 illustrates the circuit configuration of radio frequency circuit 1A and communication device 6A according to Example 1. As illustrated in FIG. 3, communication device 6A includes radio frequency circuit 1A, antenna circuit 5, RFIC 3, and BBIC 4. Radio frequency circuit 1A and communication device 6A are an example of radio frequency circuit 1 according to the embodiment and an example of communication device 6 according to the embodiment, respectively, cause transfer circuit 10A to transfer 4G radio frequency signals, and cause transfer circuit 20A to transfer 5G radio frequency signals. Radio frequency circuit 1A according to Example 1 is different from radio frequency circuit 1 according to the embodiment in that switch 30 is added and in the configuration of transfer circuit 10A. In the following, description of the configuration of radio frequency circuit 1A and communication device 6A according to Example 1 that is the same as the configuration of radio frequency circuit 1 and communication device 6 according to the embodiment is omitted, and a configuration of radio frequency circuit 1A and communication device 6A different therefrom is mainly described.

Radio frequency circuit 1A includes transfer circuits 10A and 20A, and switch 30.

Transfer circuit 10A is an example of a first transfer circuit, and transfers a radio frequency signal having a frequency range in 4G-LTE Band 13 (a first communication band), and a radio frequency signal having a frequency range in 4G-LTE Band 26 (a third communication band). Transfer circuit 10A includes transmission input terminal 120, reception output terminal 130, duplexers 11 and 16, power amplifiers 12T and 17T, low noise amplifiers 12R and 17R, and switches 13, 14, 15, 18, and 19.

Duplexer 11 allows radio frequency signals having frequency ranges in 4G-LTE Band 13 to pass through. Duplexer 11 includes transmission filter 11T and receiving filter 11R. The output terminal of transmission filter 11T and the input terminal of receiving filter 11R are connected to terminal 15b of switch 15, the input terminal of transmission filter 11T is connected to terminal 13b of switch 13, and the output terminal of receiving filter 11R is connected to terminal 18a of switch 18. Transmission filter 11T has a passband that is the transmission band (a first transmission band) of 4G-LTE Band 13, and receiving filter 11R has a passband that is the reception band (a first reception band) of 4G-LTE Band 13.

Duplexer 16 allows radio frequency signals having frequency ranges in 4G-LTE Band 26. Duplexer 16 includes transmission filter 16T and receiving filter 16R. The output terminal of transmission filter 16T and the input terminal of receiving filter 16R are connected to terminal 15c of switch 15, the input terminal of transmission filter 16T is connected to terminal 13b of switch 13, and the output terminal of receiving filter 16R is connected to terminal 18b of switch 18. Transmission filter 16T has a passband that is the transmission band of 4G-LTE Band 26 (a third transmission band), and receiving filter 16R has a passband that is the receiving band of 4G-LTE Band 26 (a third receiving band).

Power amplifier 12T is an example of a first power amplifier, and amplifies a transmission signal having a frequency range in the transmission band of 4G-LTE Band 13 and input through transmission input terminal 120. Power amplifier 12T is connected between switch 14 and switch 13.

Power amplifier 17T amplifies a transmission signal having a frequency range in the transmission band of 4G-LTE Band 26 and input through transmission input terminal 120. Power amplifier 17T is connected between switch 14 and switch 13.

Note that power amplifiers 12T and 17T may have the same amplification characteristics. Thus, power amplifier 12T may amplify a transmission signal having a frequency range in the transmission band of 4G-LTE Band 13 and a transmission signal having a frequency range in the transmission band of 4G-LTE Band 26. Power amplifier 17T may amplify a transmission signal having a frequency range in the transmission band of 4G-LTE Band 13, and a transmission signal having a frequency range in the transmission band of 4G-LTE Band 26. Accordingly, the cost of radio frequency circuit 1A can be reduced. In this case, power amplifiers 12T and 17T may be achieved by a single power amplifier. This can miniaturize radio frequency circuit 1A.

Low noise amplifier 12R amplifies a reception signal having a frequency range in the receiving band of 4G-LTE Band 13 and input via switch 15. Low noise amplifier 12R is connected between switch 18 and switch 19.

Low noise amplifier 17R amplifies a reception signal having a frequency range in the receiving band of 4G-LTE Band 26 and input via switch 15. Low noise amplifier 17R is connected between switch 18 and switch 19.

Low noise amplifiers 12R and 17R may have the same amplification characteristics. Specifically, low noise amplifier 12R may amplify a reception signal having a frequency range in the receiving band of 4G-LTE Band 13, and a reception signal having a frequency range in the receiving band of 4G-LTE Band 26, and low noise amplifier 17R may amplify a reception signal having a frequency range in the receiving band of 4G-LTE Band 13 and a reception signal having a frequency range in the receiving band of 4G-LTE Band 26. Accordingly, the cost of radio frequency circuit 1A can be reduced. In this case, low noise amplifiers 12R and 17R may be achieved by a single low noise amplifier. This can miniaturize radio frequency circuit 1A.

Switch 15 includes terminal 15a (a first terminal) and terminals 15b and 15c, and switches between connecting terminal 15a to terminal 15b and connecting terminal 15a to terminal 15c. Terminal 15a is connected to selection terminal 30c of switch 30, terminal 15b is connected to duplexer 11, and terminal 15c is connected to duplexer 16.

Switch 13 has terminals 13a, 13b, 13c, and 13d, and switches between connecting and disconnecting terminal 13a to/from terminal 13c, and switches between connecting and disconnecting terminal 13b to/from terminal 13d. Terminal 13a is connected to the input terminal of transmission filter 11T, terminal 13b is connected to the input terminal of transmission filter 16T, terminal 13c is connected to the output terminal of power amplifier 12T, and terminal 13d is connected to the output terminal of power amplifier 17T.

Switch 18 includes terminals 18a, 18b, 18c, and 18d, and switches between connecting and disconnecting terminal 18a to/from terminal 18c, and switches between connecting and disconnecting terminal 18b to/from terminal 18d. Terminal 18a is connected to the output terminal of receiving filter 11R, terminal 18b is connected to the output terminal of receiving filter 16R, terminal 18c is connected to the input terminal of low noise amplifier 12R, and terminal 18d is connected to the input terminal of low noise amplifier 17R.

Switch 14 is disposed between transmission input terminal 120 and power amplifiers 12T and 17T, and switches between connecting transmission input terminal 120 to power amplifier 12T and connecting transmission input terminal 120 to power amplifier 17T.

Switch 19 is disposed between reception output terminal 130 and low noise amplifiers 12R and 17R, and switches between connecting reception output terminal 130 to low noise amplifier 12R and connecting reception output terminal 130 to low noise amplifier 17R.

According to the above configuration, transfer circuit 10A transmits and receives radio frequency signals having frequency ranges in 4G-LTE Band 13 by FDD, and transmits and receives radio frequency signals having frequency ranges in 4G-LTE Band 26 by FDD. At this time, the switching of switches 13, 14, 15, 18, and 19 allows exclusive selection from among transmission and reception of radio frequency signals having frequency ranges in 4G-LTE Band 13, and transmission and reception of radio frequency signals having frequency ranges in 4G-LTE Band 26.

Transfer circuit 20A is an example of a second transfer circuit, transfers radio frequency signals having frequency ranges in 5G-NR n26 (a second communication band). Transfer circuit 20A includes transmission reception terminal 210 (a second terminal), transmission input terminal 220, reception output terminal 230, duplexer 21, power amplifier 22T, and low noise amplifier 22R.

Duplexer 21 allows radio frequency signals having frequency ranges in 5G-NR n26. Duplexer 21 includes transmission filter 21T and receiving filter 21R. Transmission filter 21T has a passband that is the transmission band of 5G-NR n26 (the second transmission band), and receiving filter 21R has a passband that is the reception band of 5G-NR n26 (the second reception band).

Power amplifier 22T is an example of a second power amplifier, amplifies transmission signals having frequency ranges in the transmission band of 5G-NR n26 and input through transmission input terminal 220.

Low noise amplifier 22R amplifies a reception signal having a frequency range in the receiving band of 5G-NR n26 and input through transmission reception terminal 210.

According to the above configuration, transfer circuit 20A transmits and receives radio frequency signals having frequency ranges in 5G-NR n26 by FDD.

Accordingly, transfer circuit 10A transfers radio frequency signals used in 4G, and transfer circuit 20A transfers radio frequency signals used in 5G.

Switch 30 includes antenna terminal 30a (a first antenna terminal), antenna terminal 30b (a second antenna terminal), selection terminal 30c (a first selection terminal), and selection terminal 30d (a second selection terminal). Antenna terminal 30a is connected to antenna 51, and antenna terminal 30b is connected to antenna 52. Selection terminal 30c is connected to terminal 15a of transfer circuit 10A, and selection terminal 30d is connected to transmission reception terminal 210 of transfer circuit 20A.

Switch 30 switches between connecting antenna terminal 30a to selection terminal 30c and connecting antenna terminal 30a to selection terminal 30d, and switches between connecting antenna terminal 30b to selection terminal 30c and connecting antenna terminal 30b to selection terminal 30d.

Switch 30 is a double pole double throw (DPDT) switch circuit that includes antenna terminals 30a and 30b, and selection terminals 30c and 30d, for example. Note that switch 30 may be a switch circuit such as a double pole three throw (DP3T) or double pole four throw (DP4T) switch circuit, and in this case, a necessary number of terminals are used based on the number of transfer circuits connected.

Radio frequency circuit 1A having the above configuration can transfer a 4G radio frequency signal and a 5G radio frequency signal. Furthermore, radio frequency circuit 1A can (1) simultaneously transmit a transmission signal having a frequency range in 4G-LTE Band 13 using transfer circuit 10A, and a transmission signal having a frequency range in 5G-NR n26 using transfer circuit 20A (through E-UTRA-NR dual connectivity (EN-DC)), and (2) simultaneously transmit a transmission signal having a frequency range in 4G-LTE Band 26 using transfer circuit 10A, and a transmission signal having a frequency range in 5G-NR n26 using transfer circuit 20A (through EN-DC).

Here, transfer circuit 10A and transfer circuit 20A are mounted on different mounting boards in radio frequency circuit 1A according to this example.

Accordingly, 4G and 5G radio frequency signals can be simultaneously transferred (through EN-DC), while reducing intermodulation distortion that occurs due to the 4G and 5G radio frequency signals.

The passband (4G-LTE Band 26) of duplexer 16 and the passband (5G-NR n26) of duplexer 21 have the same frequency range. In this respect, radio frequency signals having overlapping frequency ranges in 4G-LTE Band 26 and 5G-NR n26 can be separately transferred by transfer circuits 10A and 20A mounted on different mounting boards. Thus, a radio frequency signal having a frequency range in 4G-LTE Band 26 and transferred in transfer circuit 10A and a radio frequency signal having a frequency range in 5G-NR n26 and transferred in transfer circuit 20A can be simultaneously transferred while high isolation therebetween is ensured.

Note that the passband of duplexer 16 and the passband of duplexer 21 may not completely match, and may at least partially overlap.

Even in this case, a 4G-LTE radio frequency signal and a 5G-NR radio frequency signal having partially overlapping frequency ranges can be separately transferred by transfer circuits 10A and 20A mounted on different mounting boards. Thus, a 4G-LTE radio frequency signal transferred in transfer circuit 10A and a 5G-NR radio frequency signal transferred in transfer circuit 20A can be simultaneously transferred while high isolation therebetween is ensured.

RFIC 3 is an RF signal processing circuit that processes radio frequency signals. Specifically, RFIC 3 processes transmission signals input from BBIC 4 by up-conversion, for instance, and outputs transmission signals generated by being processed to transfer circuits 10 and 20. RFIC 3 includes a controller that outputs, to switches 13, 14, 15, 18, and 19, control signals for changing the connecting states of switches 13, 14, 15, 18, and 19, based on a combination of communication systems and communication bands of radio frequency signals transferred in radio frequency circuit 1A. The controller of RFIC 3 may output, to switch 30, a control signal for changing the connecting state of switch 30, based on a state of an antenna such as antenna sensitivity.

Non-standalone New Radio (NSA-NR) that is a communication architecture having been recently introduced allows a communication area for 5G (NR) to be built in a communication area for 4G (E-UTRA), so as to allow a 4G control channel to control both 5G (NR) communication and 4G (E-UTRA) communication. Accordingly, in NSA-NR, while a 4G (E-UTRA) transfer circuit serves as a master and a 5G (NR) transfer circuit serves as a slave, the 4G transfer circuit and the 5G transfer circuit are to be simultaneously connected to communication lines (through EN-DC). In order to optimize the EN-DC communication environment, for example, a configuration can be considered in which 4G (E-UTRA) transfer circuit 10A is connected to an antenna having high sensitivity, whereas 5G (NR) transfer circuit 20A is connected to an antenna having low sensitivity.

Accordingly, switch 30 can switch between connecting transfer circuit 10A to antenna 51 and connecting transfer circuit 20A to antenna 52, based on a state of an antenna such as antenna sensitivity. Thus, the communication quality of radio frequency circuit 1A can be improved.

3 Configuration of Radio Frequency Circuit 1B and Communication Device 6B According to Example 2

Figure 4:
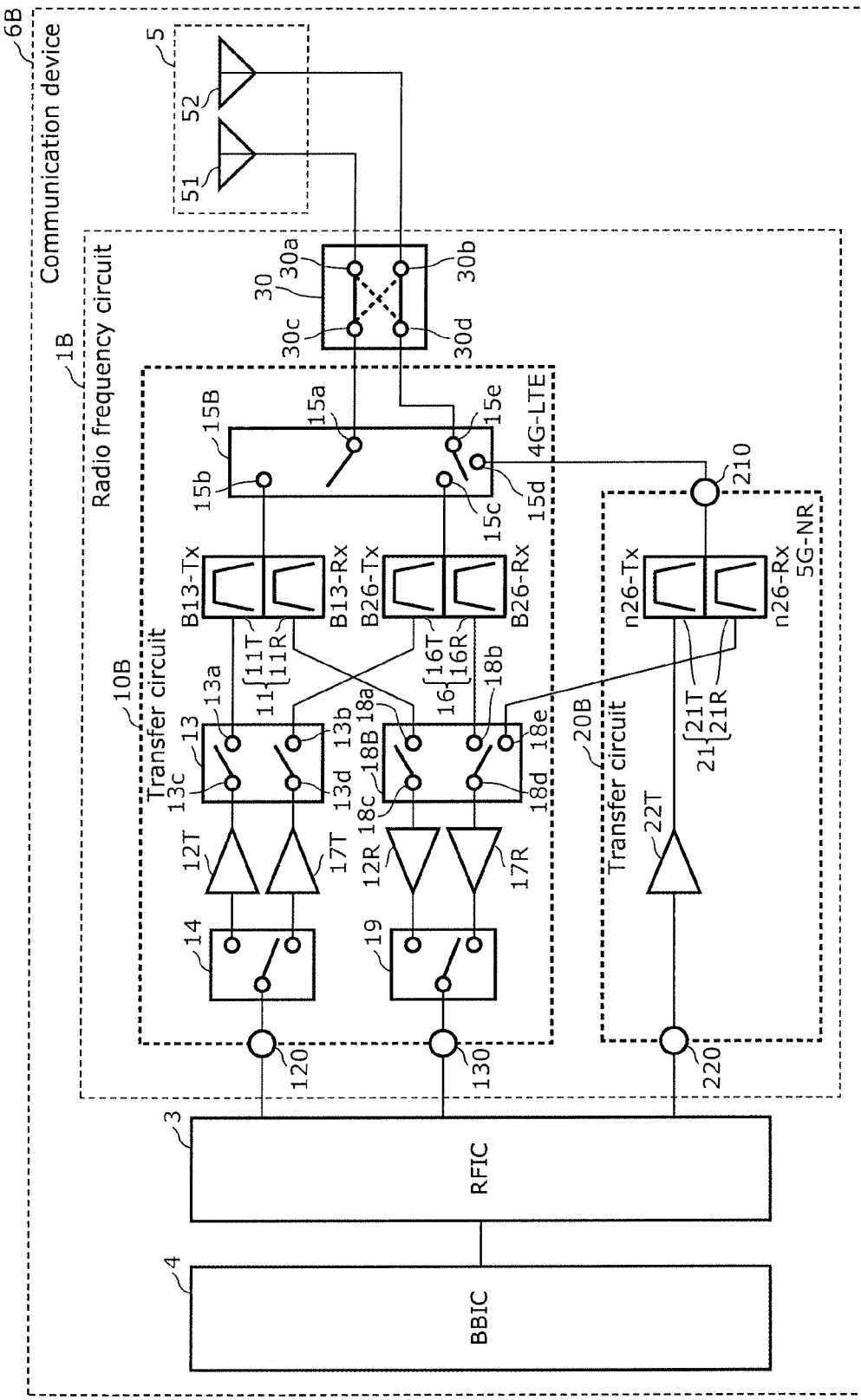
FIG. 4 illustrates a circuit configuration of a radio frequency circuit and a communication device according to Example 2.

FIG. 4 illustrates the circuit configuration of radio frequency circuit 1B and communication device 6B according to Example 2. As illustrated in FIG. 4, communication device 6B includes radio frequency circuit 1B, antenna circuit 5, RFIC 3, and BBIC 4. Radio frequency circuit 1B and communication device 6B are an example of radio frequency circuit 1 according to the embodiment and an example of communication device 6 according to the embodiment, respectively, and causes transfer circuit 10B to transfer a 4G radio frequency signal, and causes transfer circuit 20B to transfer a 5G radio frequency signal. Radio frequency circuit 1B according to Example 2 is different from radio frequency circuit 1A according to Example 1 in that transfer circuit 20B does not include low noise amplifier 22R. In the following, description of the configuration of radio frequency circuit 1B and communication device 6B according to Example 2 that is the same as the configuration of radio frequency circuit 1A and communication device 6A according to Example 1 is omitted, and a configuration of radio frequency circuit 1B and communication device 6B different therefrom is mainly described.

Radio frequency circuit 1B includes transfer circuits 10B and 20B, and switch 30.

Transfer circuit 10B is an example of a first transfer circuit, and transfers radio frequency signals having frequency ranges in 4G-LTE Band 13 (a first communication band), and radio frequency signals having frequency ranges in 4G-LTE Band 26 (a third communication band). Transfer circuit 10B includes transmission input terminal 120, reception output terminal 130, duplexers 11 and 16, power amplifiers 12T and 17T, low noise amplifiers 12R and 17R, and switches 13, 14, 15B, 18B, and 19.

Duplexer 11 allows radio frequency signals having frequency ranges in 4G-LTE Band 13 to pass through. Duplexer 11 includes transmission filter 11T and receiving filter 11R. The output terminal of transmission filter 11T and the input terminal of receiving filter 16R are connected to terminal 15b of switch 15B, the input terminal of transmission filter 11T is connected to terminal 13a of switch 13, and the output terminal of receiving filter 11R is connected to terminal 18a of switch 18B.

Duplexer 16 allows radio frequency signals having frequency ranges in 4G-LTE Band 26 to pass through. Duplexer 16 includes transmission filter 16T and receiving filter 16R. The output terminal of transmission filter 16T and the input terminal of receiving filter 16R are connected to terminal 15c of switch 15B, the input terminal of transmission filter 16T is connected to terminal 13b of switch 13, and the output terminal of receiving filter 16R is connected to terminal 18b of switch 18.

Low noise amplifier 12R is an example of a first low noise amplifier, and amplifies a reception signal having a frequency range in the receiving band of 4G-LTE Band 13 and input via switch 15B. Low noise amplifier 12R is connected between switch 18B and switch 19.

Low noise amplifier 17R is an example of a third low noise amplifier, and amplifies a reception signal having a frequency range in the receiving band of 4G-LTE Band 26 and a reception signal having a frequency range in the receiving band of 5G-NR n26, which are input via switch 15B. Low noise amplifier 17R is connected between switch 18B and switch 19.

Switch 15B includes terminal 15a (a first terminal), terminal 15e (a first terminal), and terminals 15b, 15c, 15d, and 15e. Switch 15B switches between connecting terminal 15a to terminal 15b and connecting terminal 15a to terminal 15c. Switch 15B switches between connecting terminal 15e to terminal 15c and connecting terminal 15e to terminal 15d. Terminal 15a is connected to selection terminal 30c of switch 30, terminal 15e is connected to selection terminal 30d of switch 30, terminal 15b is connected to duplexer 11, terminal 15c is connected to duplexer 16, and terminal 15d is connected to transmission reception terminal 210.

Switch 18B includes terminals 18a, 18b, 18c, 18d, and 18e, switches between connecting and disconnecting terminal 18a to/from terminal 18c, and switches between connecting terminal 18b to terminal 18d and connecting terminal 18e to terminal 18d. Terminal 18a is connected to the output terminal of receiving filter 11R, terminal 18b is connected to the output terminal of receiving filter 16R, terminal 18c is connected to the input terminal of low noise amplifier 12R, terminal 18d is connected to the input terminal of low noise amplifier 17R, and terminal 18e is connected to the output terminal of receiving filter 21R.

According to the above configuration, transfer circuit 10B transmits and receives a radio frequency signal having a frequency range in 4G-LTE Band 13 by FDD, and transmits and receives a radio frequency signal having a frequency range in 4G-LTE Band 26 by FDD. At this time, the switching of switches 13, 14, 15B, 18B, and 19 allows exclusive selection from among transmission and reception of radio frequency signals having frequency ranges in 4G-LTE Band 13, and transmission and reception of radio frequency signals having frequency ranges in 4G-LTE Band 26. The switching of switch 15B allows exclusive selection from among transmission and reception of radio frequency signals having frequency ranges in 4G-LTE Band 26 by transfer circuit 10B, and transmission and reception of radio frequency signals having frequency ranges in 5G-NR n26 by transfer circuit 20B.

Transfer circuit 20B is an example of a second transfer circuit, and transfers a radio frequency signal having a frequency range in 5G-NR n26 (a second communication band). Transfer circuit 20B includes transmission reception terminal 210 (a second terminal), transmission input terminal 220, duplexer 21, and power amplifier 22T. Transfer circuit 20B does not include low noise amplifier 22R or reception output terminal 230 when compared with transfer circuit 20A according to Example 1.

Duplexer 21 allows radio frequency signals having frequency ranges in 5G-NR n26 to pass through. Duplexer 21 includes transmission filter 21T and receiving filter 21R. The output terminal of transmission filter 21T and the input terminal of receiving filter 21R are connected to transmission reception terminal 210, the input terminal of transmission filter 21T is connected to the output terminal of power amplifier 22T, and the output terminal of receiving filter 21R is connected to terminal 18e of switch 18B.

According to the above configuration, low noise amplifier 17R included in transfer circuit 10B can amplify a reception signal having a frequency range in 5G-NR n26 transferred in transfer circuit 20B by connecting terminal 15e and terminal 15d in switch 15B, and connecting terminal 18d and terminal 18e in switch 18B. Accordingly, transfer circuit 20B does not need to include low noise amplifier 22R that amplifies a reception signal having a frequency range in 5G-NR n26. Accordingly, the low noise amplifier in transfer circuit 20B can be excluded, and thus radio frequency circuit 1B can be miniaturized.

The passband of duplexer 16 (4G-LTE Band 26) and the passband of duplexer 21 (5G-NR n26) have the same frequency range.

Radio frequency circuit 1B having the above configuration can transfer a 4G radio frequency signal and a 5G radio frequency signal. Furthermore, radio frequency circuit 1B can (1) simultaneously transmit a transmission signal having a frequency range in 4G-LTE Band 13 using transfer circuit 10B, and a transmission signal having a frequency range in 5G-NR n26 using transfer circuit 20B (through EN-DC), and (2) simultaneously transmit a transmission signal having a frequency range in 4G-LTE Band 26 using transfer circuit 10B, and a transmission signal having a frequency range in 5G-NR n26 using transfer circuit 20B (through EN-DC).

Here, transfer circuit 10B and transfer circuit 20B are mounted on different mounting boards in radio frequency circuit 1B according to this example.

Accordingly, 4G and 5G radio frequency signals can be simultaneously transferred (through EN-DC), while intermodulation distortion that occurs due to the 4G and 5G radio frequency signals is reduced. Further, a radio frequency signal having a frequency range in 4G-LTE Band 26 and a radio frequency signal having a frequency range in 5G-NR n26, which have overlapping frequency ranges, can be separately transferred by transfer circuits 10B and 20B mounted on different mounting boards. Thus, a radio frequency signal having a frequency range in 4G-LTE Band 26 and transferred in transfer circuit 10B and a radio frequency signal having a frequency range in 5G-NR n26 and transferred in transfer circuit 20B can be simultaneously transferred while high isolation therebetween is ensured.

Note that the passband of duplexer 16 and the passband of duplexer 21 may not completely match, and may at least partially overlap.

4 Configuration of Radio Frequency Circuit 1C and Communication Device 6C According to Example 3

Figure 5:
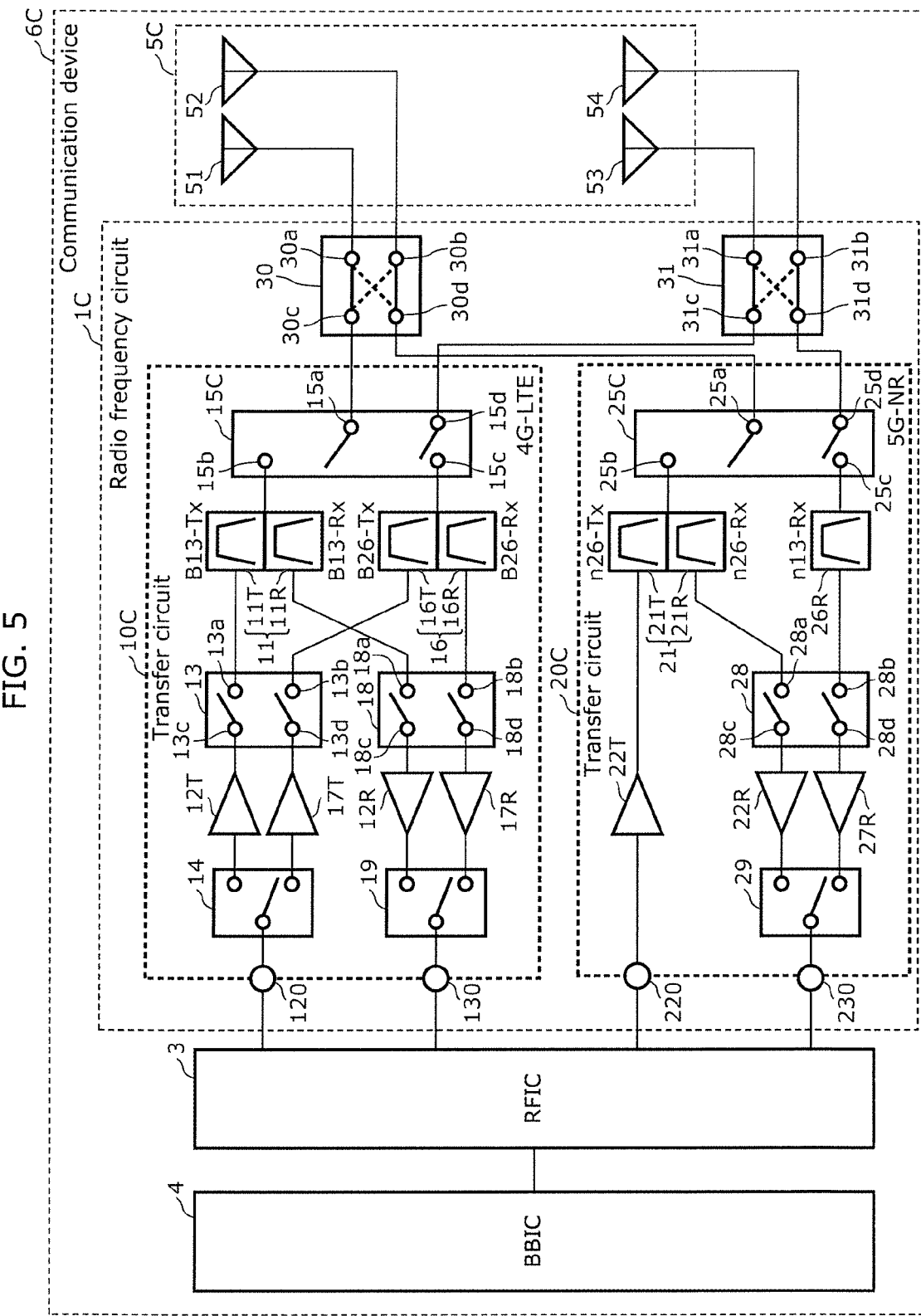
FIG. 5 illustrates a circuit configuration of a radio frequency circuit and a communication device according to Example 3.

FIG. 5 illustrates a circuit configuration of radio frequency circuit 1C and communication device 6C according to Example 3. As illustrated in FIG. 5, communication device 6C includes radio frequency circuit 1C, antenna circuit 5C, RFIC 3, and BBIC 4. Radio frequency circuit 1C and communication device 6C are an example of radio frequency circuit 1 according to the embodiment and an example of communication device 6 according to the embodiment, respectively, cause transfer circuit 10C to transfer a 4G radio frequency signal, and cause transfer circuit 20C to transfer a 5G radio frequency signal. Communication device 6C according to Example 3 is different from communication device 6A according to Example 1 in the configurations of antenna circuit 5C and radio frequency circuit 1C. Radio frequency circuit 1C according to Example 3 is different from radio frequency circuit 1A according to Example 1 in that switch 31 is added, and transfer circuit 20C has a reception path for 5G-NR n13. In the following, description of the configuration of radio frequency circuit 1C and communication device 6C according to Example 3 that is same as the configuration of radio frequency circuit 1A and communication device 6A according to Example 1 is omitted, and a configuration of radio frequency circuit 1C and communication device 6C different therefrom is mainly described.

Radio frequency circuit 1C includes transfer circuits 10C and 20C, and switches 30 and 31.

Transfer circuit 10C is an example of a first transfer circuit, and transfers a radio frequency signal having a frequency range in 4G-LTE Band 13 (a first communication band), and a radio frequency signal having a frequency range in 4G-LTE Band 26 (a third communication band). Transfer circuit 10C includes transmission input terminal 120, reception output terminal 130, duplexers 11 and 16, power amplifiers 12T and 17T, low noise amplifiers 12R and 17R, and switches 13, 14, 15C, 18, and 19.

Switch 15C includes terminal 15a (a first terminal), terminal 15d (a first terminal), and terminals 15b and 15c. Switch 15C switches between connecting terminal 15a to terminal 15b and connecting terminal 15a to terminal 15c, and switches between connecting and disconnecting terminal 15d to/from terminal 15c. Terminal 15a is connected to selection terminal 30c of switch 30, terminal 15d is connected to selection terminal 31c of switch 31, terminal 15b is connected to duplexer 11, and terminal 15c is connected to duplexer 16.

According to the above configuration, transfer circuit 10C transmits and receives radio frequency signals having frequency ranges in 4G-LTE Band 13 by FDD, and transmits and receives radio frequency signals having frequency ranges in 4G-LTE Band 26 by FDD. At this time, the switching of switches 13, 14, 15C, 18, and 19 allows exclusive selection from among transmission and reception of radio frequency signals having frequency ranges in 4G-LTE Band 13, and transmission and reception of radio frequency signals having frequency ranges in 4G-LTE Band 26.

Transfer circuit 20C is an example of a second transfer circuit, and transfers a radio frequency signal having a frequency range in 5G-NR n26 (the second communication band), and a reception signal having a frequency range in 5G-NR n13. Transfer circuit 20C includes transmission input terminal 220, reception output terminal 230, duplexer 21, receiving filter 26R, power amplifier 22T, low noise amplifiers 22R and 27R, and switches 25C, 28, and 29.

Duplexer 21 allows radio frequency signals having frequency ranges in 5G-NR n26 to pass through. Duplexer 21 includes transmission filter 21T and receiving filter 21R. The output terminal of transmission filter 21T and the input terminal of receiving filter 21R are connected to terminal 25b of switch 25C, the input terminal of transmission filter 21T is connected to the output terminal of power amplifier 22T, and the output terminal of receiving filter 21R is connected to terminal 28a of switch 28.

Receiving filter 26R allows a radio frequency signal having a frequency range in 5G-NR n13 to pass through. The input terminal of receiving filter 26R is connected to terminal 25c of switch 25C, and the output terminal of receiving filter 26R is connected to terminal 28b of switch 28. Receiving filter 26R has a passband that is the reception band of 5G-NR n13 (a first reception band).

Low noise amplifier 22R is an example of a second low noise amplifier, and amplifies a reception signal having a frequency range in the receiving band of 5G-NR n26 (a second receiving band) and input via switch 25C. Low noise amplifier 22R is connected between switch 28 and switch 29.

Low noise amplifier 27R is an example of a fourth low noise amplifier, and amplifies a reception signal having a frequency range in the receiving band of 5G-NR n13 (a first receiving band) and input via switch 25C. Low noise amplifier 27R is connected between switch 28 and switch 29.

Switch 25C includes terminal 25a (a second terminal), terminal 25d (a second terminal), and terminals 25b and 25c. Switch 25C switches between connecting terminal 25a to terminal 25b and connecting terminal 25a to terminal 25c. Switch 25C switches between connecting and disconnecting terminal 25d to/from terminal 25c. Terminal 25a is connected to selection terminal 30d of switch 30, terminal 25d is connected to selection terminal 31d of switch 31, terminal 25b is connected to duplexer 21, and terminal 25c is connected to receiving filter 26R.

According to the above configuration, transfer circuit 20C transmits and receives radio frequency signals having frequency ranges in 5G-NR n26 by FDD, and receives a radio frequency signal having a frequency range in 5G-NR n13.

Stated differently, transfer circuit 10C transfers 4G radio frequency signals, and transfer circuit 20C transfers 5G radio frequency signals.

Antenna circuit 5C includes antennas 51, 52, 53, and 54. Antennas 51 to 54 radiate and receive radio frequency signals.

Switch 30 includes antenna terminal 30a (a first antenna terminal), antenna terminal 30b (a second antenna terminal), selection terminal 30c (a first selection terminal), and selection terminal 30d (a second selection terminal). Antenna terminal 30a is connected to antenna 51, and antenna terminal 30b is connected to antenna 52. Selection terminal 30c is connected to terminal 15a of transfer circuit 10C, and selection terminal 30d is connected to terminal 25a of transfer circuit 20C.

Switch 31 includes antenna terminals 31a and 31b, and selection terminals 31c and 31d. Antenna terminal 31a is connected to antenna 53, and antenna terminal 31b is connected to antenna 54. Selection terminal 31c is connected to terminal 15d of transfer circuit 10C, and selection terminal 31d is connected to terminal 25d of transfer circuit 20C.

Switch 31 switches between connecting antenna terminal 31a to selection terminal 31c and connecting antenna terminal 31a to selection terminal 31d, and switches between connecting antenna terminal 31b to selection terminal 31c and connecting antenna terminal 31b to selection terminal 31d.

The passband of duplexer 16 (4G-LTE Band 26) and the passband of duplexer 21 (5G-NR n26) have the same frequency range. The receiving band of duplexer 11 (4G-LTE Band 13-Rx) and the receiving band of receiving filter 26R (5G-NR n13-Rx) have the same frequency range.

Radio frequency circuit 1C having the above configuration can transfer 4G radio frequency signals and 5G radio frequency signals. Furthermore, radio frequency circuit 1C can (1) simultaneously transmit a transmission signal having a frequency range in 4G-LTE Band 13 using transfer circuit 10C, and a transmission signal having a frequency range in 5G-NR n26 using transfer circuit 20C (through EN-DC), and (2) simultaneously transmit a transmission signal having a frequency range in 4G-LTE Band 26 using transfer circuit 10C, and a transmission signal having a frequency range in 5G-NR n26 using transfer circuit 20C (through EN-DC). Furthermore, radio frequency circuit 1C can receive a reception signal having a frequency range in 5G-NR n13 using transfer circuit 20C, simultaneously with (1) and (2) above.

Here, transfer circuit 10C and transfer circuit 20C are mounted on different mounting boards in radio frequency circuit 1C according to this example.

Transfer circuit 20C includes low noise amplifier 27R that amplifies a reception signal having a frequency range in the receiving band of 5G-NR n13, and does not include a power amplifier that amplifies a transmission signal having a frequency range in the transmission band of 5G-NR n13.

According to this, transfer circuit 10C includes both of the transmission and reception paths for 4G-LTE Band 13, whereas transfer circuit 20C includes only a reception path for 5G-NR n13 out of the transmission and reception paths therefor. Accordingly, intermodulation distortion that occurs due to a transmission signal transferred in transfer circuit 10C and a transmission signal transferred in transfer circuit 20C can be reduced while transfer circuit 20C is used as a diversity circuit.

5 Configuration of Radio Frequency Circuit 1D and Communication Device 6D According to Example 4

Figure 6:
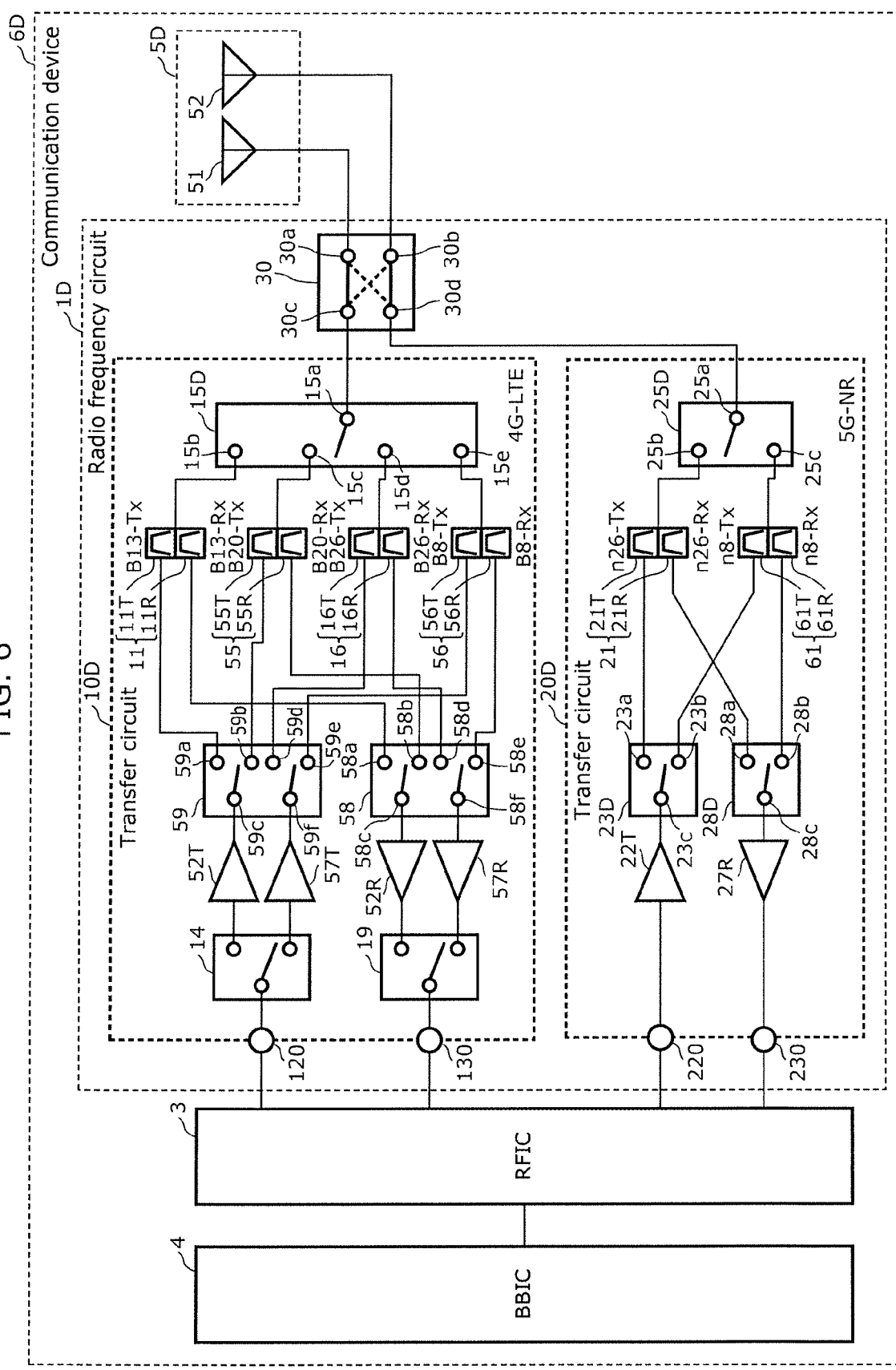
FIG. 6 illustrates a circuit configuration of a radio frequency circuit and a communication device according to Example 4.

FIG. 6 illustrates a circuit configuration of radio frequency circuit 1D and communication device 6D according to Example 4. As illustrated in FIG. 6, communication device 6D includes radio frequency circuit 1D, antenna circuit 5D, RFIC 3, and BBIC 4. Radio frequency circuit 1D and communication device 6D are an example of radio frequency circuit 1 according to the embodiment and an example of communication device 6 according to the embodiment, respectively, cause transfer circuit 10D to transfer 4G radio frequency signals, and cause transfer circuit 20D to transfer 5G radio frequency signals. Radio frequency circuit 1D according to Example 4 has a configuration that allows EN-DC using communication bands 20 and 8, in addition to EN-DC using communication bands 13 and 26, as compared with radio frequency circuit 1A according to Example 1. In the following, description of the configuration of radio frequency circuit 1D and communication device 6D according to Example 4 that is the same as the configuration of radio frequency circuit 1A and communication device 6A according to Example 1 is omitted, and a configuration of radio frequency circuit 1D and communication device 6D different therefrom is mainly described.

Radio frequency circuit 1D includes transfer circuits 10D and 20D, and switch 30.

Transfer circuit 10D is an example of a first transfer circuit, and transfers radio frequency signals having frequency ranges in 4G-LTE Band 13 (a first communication band), radio frequency signals having frequency ranges in 4G-LTE Band 26 (a third communication band), radio frequency signals having frequency ranges in 4G-LTE Band 20 (a fourth communication band), and radio frequency signals having frequency ranges in 4G-LTE Band 8 (a fifth communication band). Transfer circuit 10D includes transmission input terminal 120, reception output terminal 130, duplexers 11, 16, 55, and 56, power amplifiers 52T and 57T, low noise amplifiers 52R and 57R, and switches 14, 15D, 19, 59, and 58.

Duplexer 11 includes transmission filter 11T and receiving filter 11R. The output terminal of transmission filter 11T and the input terminal of receiving filter 11R are connected to terminal 15b of switch 15D, the input terminal of transmission filter 11T is connected to terminal 59a of switch 59, and the output terminal of receiving filter 11R is connected to terminal 58a of switch 58.

Duplexer 55 includes transmission filter 55T and receiving filter 55R. The output terminal of transmission filter 55T and the input terminal of receiving filter 55R are connected to terminal 15c of switch 15D, the input terminal of transmission filter 55T is connected to terminal 59b of switch 59, and the output terminal of receiving filter 55R is connected to terminal 58b of switch 58. Transmission filter 55T has a passband that is the transmission band of 4G-LTE band 20 (a fourth transmission band), and receiving filter 55R has a passband that is the reception band of 4G-LTE band 20 (a fourth reception band).

Duplexer 16 includes transmission filter 16T and receiving filter 16R. The output terminal of transmission filter 16T and the input terminal of receiving filter 16R are connected to terminal 15d of switch 15D, the input terminal of transmission filter 16T is connected to terminal 59d of switch 59, and the output terminal of receiving filter 16R is connected to terminal 58d of switch 58.

Duplexer 56 includes transmission filter 56T and receiving filter 56R. The output terminal of transmission filter 56T and the input terminal of receiving filter 56R are connected to terminal 15e of switch 15D, the input terminal of transmission filter 56T is connected to terminal 59e of switch 59, and the output terminal of receiving filter 56R is connected to terminal 58e of switch 58. Transmission filter 56T has a passband that is the transmission band of 4G-LTE band 8 (a fifth transmission band), and receiving filter 56R has a passband that is the reception band of 4G-LTE band 8 (a fifth reception band).

Power amplifier 52T is an example of a first power amplifier, and amplifies transmission signals having frequency ranges in the transmission bands of 4G-LTE Band 13 and 4G-LTE Band 20 and input through transmission input terminal 120. Power amplifier 52T is connected between switch 14 and switch 59.

Power amplifier 57T amplifies transmission signals having frequency ranges in the transmission bands of 4G-LTE Band 26 and 4G-LTE Band 8 and input through transmission input terminal 120. Power amplifier 57T is connected between switch 14 and switch 59.

Low noise amplifier 52R amplifies reception signals having frequency ranges in the receiving bands of 4G-LTE band 13 and 4G-LTE Band 20 and input through switch 15D. Low noise amplifier 52R is connected between switch 58 and switch 19.

Low noise amplifier 57R amplifies reception signals having frequency ranges in the receiving bands of 4G-LTE Band 26 and 4G-LTE Band 8 and input through switch 15D. Low noise amplifier 57R is connected between switch 58 and switch 19.

Switch 15D includes terminal 15a (a first terminal) and terminals 15b, 15c, 15d, and 15e, and switches among connecting terminal 15a to terminal 15b, connecting terminal 15a to terminal 15c, connecting terminal 15a to terminal 15d, and connecting terminal 15a to terminal 15e. Terminal 15a is connected to selection terminal 30c of switch 30.

Switch 59 includes terminals 59a, 59b, 59c, 59d, 59e, and 59f, switches between connecting terminal 59c to terminal 59a and connecting terminal 59c to terminal 59b, and switches between connecting terminal 59f to terminal 59d and connecting terminal 59f to terminal 59e. Terminal 59c is connected to the output terminal of power amplifier 52T, and terminal 59f is connected to the output terminal of power amplifier 57T.

Switch 58 includes terminals 58a, 58b, 58c, 58d, 58e, and 58f, switches between connecting terminal 58c to terminal 58a and connecting terminal 58c to terminal 58b, and switches between connecting terminal 58f to terminal 58d and connecting terminal 58f to terminal 58e. Terminal 58c is connected to the input terminal of low noise amplifier 52R, and terminal 58f is connected to the input terminal of low noise amplifier 57R.

Switch 14 is disposed between transmission input terminal 120 and power amplifiers 52T and 57T, and switches between connecting transmission input terminal 120 to power amplifier 52T and connecting transmission input terminal 120 to power amplifier 57T.

Switch 19 is disposed between reception output terminal 130 and low noise amplifiers 52R and 57R, switches between connecting reception output terminal 130 to low noise amplifier 52R and connecting reception output terminal 130 to low noise amplifier 57R.

According to the above configuration, transfer circuit 10D transmits and receives radio frequency signals having frequency ranges in 4G-LTE Band 13 by FDD, transmits and receives radio frequency signals having frequency ranges in 4G-LTE Band 26 by FDD, transmits and receives radio frequency signals having frequency ranges in 4G-LTE Band 20 by FDD, and transmits and receives radio frequency signals having frequency ranges in 4G-LTE Band 8 by FDD. At this time, switching of switches 14, 15D, 19, 59, and 58 allows selecting one of: transmission and reception of radio frequency signals having frequency ranges in 4G-LTE Band 13; transmission and reception of radio frequency signals having frequency ranges in 4G-LTE Band 26; transmission and reception of radio frequency signals having frequency ranges in 4G-LTE Band 20; and transmission and reception of radio frequency signals having frequency ranges in 4G-LTE Band 8.

Transfer circuit 20D is an example of a second transfer circuit, and transfers radio frequency signals having frequency ranges in 5G-NR n26 (a second communication band), and radio frequency signals having frequency ranges in 5G-NR n8 (a fifth communication band). Transfer circuit 20D includes transmission input terminal 220, reception output terminal 230, duplexers 21 and 61, power amplifier 22T, low noise amplifier 27R, and switches 23D, 25D, and 28D.

Duplexer 21 includes transmission filter 21T and receiving filter 21R. The output terminal of transmission filter 21T and the input terminal of receiving filter 21R are connected to terminal 25b of switch 25D, the input terminal of transmission filter 21T is connected to terminal 23a of switch 23D, and the output terminal of receiving filter 21R is connected to terminal 28a of switch 28D.

Duplexer 61 includes transmission filter 61T and receiving filter 61R. The output terminal of transmission filter 61T and the input terminal of receiving filter 61R are connected to terminal 25c of switch 25D, the input terminal of transmission filter 61T is connected to terminal 23b of switch 23D, and the output terminal of receiving filter 61R is connected to terminal 28b of switch 28D. Transmission filter 61T has a passband that is the transmission band of 5G-NR n8 (a fifth transmission band), and receiving filter 61R has a passband that is the reception band of 5G-NR n8 (a fifth reception bands).

Power amplifier 22T is an example of second power amplifiers, and amplifies transmission signals having frequency ranges in the transmission bands of 5G-NR n26 and n8 and input through transmission input terminal 220. Power amplifier 22T is connected between transmission input terminal 220 and switch 23D.

Low noise amplifier 27R amplifies reception signals having frequency ranges in the receiving bands of 5G-NR n26 and n8 and input through switch 25D. Low noise amplifier 27R is connected between switch 28D and reception output terminal 230.

Switch 25D includes terminal 25a (a second terminal) and terminals 25b and 25c, and switches between connecting terminal 25a to terminal 25b and connecting terminal 25a to terminal 25c. Terminal 25a is connected to selection terminal 30d of switch 30.

Switch 23D includes terminal 23c, and terminals 23a and 23b, and switches between connecting terminal 23c to terminal 23a and connecting terminal 23c to terminal 23b. Terminal 23c is connected to the output terminal of power amplifier 22T.

Switch 28D includes terminal 28c, and terminals 28a and 28b, and switches between connecting terminal 28c to terminal 28a and connecting terminal 28c to terminal 28b. Terminal 28c is connected to the input terminal of low noise amplifier 27R.

According to the above configuration, transfer circuit 20D transmits and receives radio frequency signals having frequency ranges in 5G-NR n26 by FDD, and transmits and receives radio frequency signals having frequency ranges in 5G-NR n8 by FDD. At this time, the switching of switches 23D, 25D, and 28D allows exclusive selection from among transmission and reception of radio frequency signals having frequency ranges in 5G-NR n26, and transmission and reception of radio frequency signals having frequency ranges in 5G-NR n8.

Switch 30 includes antenna terminal 30a (a first antenna terminal), antenna terminal 30b (a second antenna terminal), selection terminal 30c (a first selection terminal), and selection terminal 30d (a second selection terminal). Antenna terminal 30a is connected to antenna 51, and antenna terminal 30b is connected to antenna 52. Selection terminal 30c is connected to terminal 15a of transfer circuit 10D, and selection terminal 30d is connected to terminal 25a of transfer circuit 20D.

Radio frequency circuit 1D having the above configuration can transfer 4G radio frequency signals and 5G radio frequency signals. Radio frequency circuit 1D can (1) simultaneously transmit a transmission signal having a frequency range in 4G-LTE Band 13 using transfer circuit 10D, and a transmission signal having a frequency range in 5G-NR n26 using transfer circuit 20D (through EN-DC), (2) simultaneously transmit a transmission signal having a frequency range in 4G-LTE Band 26 using transfer circuit 10D, and a transmission signal having a frequency range in 5G-NR n26 using transfer circuit 20D (through EN-DC), (3) simultaneously transmit a transmission signal having a frequency range in 4G-LTE Band 20 using transfer circuit 10D, and a transmission signal having a frequency range in 5G-NR n8 using transfer circuit 20D (through EN-DC), and (4) simultaneously transmit a transmission signal having a frequency range in 4G-LTE Band 8 using transfer circuit 10D, and a transmission signal having a frequency range in 5G-NR n8 using transfer circuit 20D (through EN-DC).

Here, transfer circuit 10D and transfer circuit 20D are mounted on different mounting boards in radio frequency circuit 1D according to this example.

When radio frequency signals having frequency ranges in communication bands 13 and 26 in different communication systems which are in a relation in which transmission bands are adjacent to each other without a receiving band being located therebetween are simultaneously transmitted (through EN-DC), frequencies of spurious emissions that cause intermodulation distortion may overlap the receiving band(s) of communication band 13 and/or communication band 26 since the transmission bands are adjacent to each other. In this case, the receiving sensitivity to a radio frequency signal having a frequency range in communication band 13/26 falls. When radio frequency signals having frequency ranges in communication bands 20 and 8 in different communication systems which are in a relation in which transmission bands are adjacent to each other without a receiving band being located therebetween are simultaneously transmitted (through EN-DC), frequencies of spurious emissions that cause intermodulation distortion may overlap the receiving band(s) of communication band 20 and/or communication band 8 since the transmission bands are adjacent to each other. In this case, the receiving sensitivity to a radio frequency signal having a frequency range in communication band 20/8 falls.

In the above respect, according to the above configuration of radio frequency circuit 1D according to this example, 4G and 5G radio frequency signals can be simultaneously transferred (through EN-DC), while intermodulation distortion that occurs due to the 4G and 5G radio frequency signals is reduced.

The passband of duplexer 16 (4G-LTE Band 26) and the passband of duplexer 21 (5G-NR n26) have the same frequency range. The passband of duplexer 56 (4G-LTE Band 8) and the passband of duplexer 61 (5G-NR n8) have the same frequency range. To address this, radio frequency signals having overlapping frequency ranges in 4G-LTE Band 26 and 5G-NR n26 can be separately transferred by transfer circuits 10D and 20D mounted on different mounting boards. Thus, a radio frequency signal having a frequency range in 4G-LTE Band 26 and transferred in transfer circuit 10D and a radio frequency signal having a frequency range in 5G-NR n26 and transferred in transfer circuit 20D can be simultaneously transferred while high isolation therebetween is ensured. Further, radio frequency signals having overlapping frequency ranges in 4G-LTE Band 8 and 5G-NR n8 can be separately transferred by transfer circuits 10D and 20D mounted on different mounting boards. Thus, a radio frequency signal having a frequency range in 4G-LTE Band 8 and transferred in transfer circuit 10D and a radio frequency signal having a frequency range in 5G-NR n26 and transferred in transfer circuit 20D can be simultaneously transferred while high isolation therebetween is ensured.

Note that the passband of duplexer 16 and the passband of duplexer 21 may not completely match and may at least partially overlap. Note that the passband of duplexer 56 and the passband of duplexer 61 may not completely match and may at least partially overlap.

Even in this case, a 4G-LTE radio frequency signal and a 5G-NR radio frequency signal having partially overlapping frequency ranges can be separately transferred by transfer circuits 10D and 20D mounted on different mounting boards. Thus, a 4G-LTE radio frequency signal transferred by transfer circuit 10D and a 5G-NR radio frequency signal transferred by transfer circuit 20D can be simultaneously transferred while high isolation therebetween is ensured.

Note that in this example, as in radio frequency circuit 1B according to Example 2, low noise amplifier 57R included in transfer circuit 10D may amplify reception signals having frequency ranges in 5G-NR n26 and n8 and transferred in transfer circuit 20D. Accordingly, transfer circuit 20D does not need to include low noise amplifier 27R. Consequently, the low noise amplifier in transfer circuit 20D can be excluded, and thus radio frequency circuit 1D can be miniaturized.

6 Configuration of Radio Frequency Circuit 1E and Communication Device 6E According to Example 5

Figure 7:
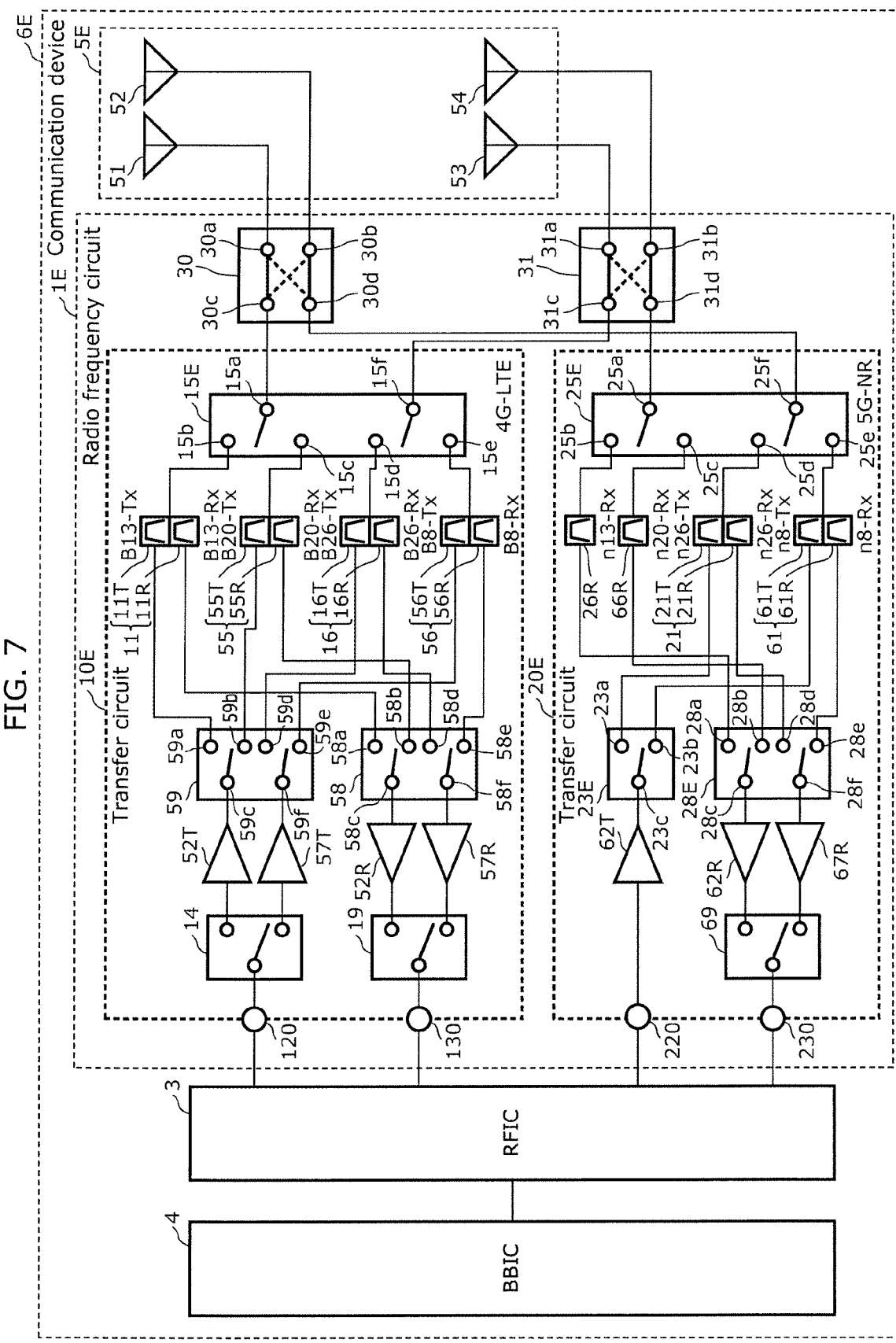
FIG. 7 illustrates a circuit configuration of a radio frequency circuit and a communication device according to Example 5.

FIG. 7 illustrates a circuit configuration of radio frequency circuit 1E and communication device 6E according to Example 5. As illustrated in FIG. 7, communication device 6E includes radio frequency circuit 1E, antenna circuit 5E, RFIC 3, and BBIC 4. Radio frequency circuit 1E and communication device 6E are an example of radio frequency circuit 1 according to the embodiment and an example of communication device 6 according to the embodiment, respectively, cause transfer circuit 10E to transfer 4G radio frequency signals, and cause transfer circuit 20E to transfer 5G radio frequency signals. Communication device 6E according to Example 5 is different from communication device 6D according to Example 4 in the configuration of antenna circuit 5E and radio frequency circuit 1E. Radio frequency circuit 1E according to Example 5 is different from radio frequency circuit 1D according to Example 4 in that switch 31 is added, and transfer circuit 20E has a reception path for 5G-NR n13 and a reception path for 5G-NR n20. In the following, description of the configuration of radio frequency circuit 1E and communication device 6E according to Example 5 that is the same as the configuration of radio frequency circuit 1D and communication device 6D according to Example 4 is omitted, and a configuration of radio frequency circuit 1E and communication device 6E different therefrom is mainly described.

Radio frequency circuit 1E includes transfer circuits 10E and 20E, and switches 30 and 31.

Transfer circuit 10E is an example of a first transfer circuit, and transfers a radio frequency signal having a frequency range in 4G-LTE Band 13 (a first communication band), a radio frequency signal having a frequency range in 4G-LTE Band 26 (a third communication band), a radio frequency signal having a frequency range in 4G-LTE Band 20 (a fourth communication band), and a radio frequency signal having a frequency range in 4G-LTE Band 8. Transfer circuit 10E includes transmission input terminal 120, reception output terminal 130, duplexers 11, 16, 55, and 56, power amplifiers 52T and 57T, low noise amplifiers 52R and 57R, and switches 14, 15E, 19, 59, and 58.

The output terminal of transmission filter 11T and the input terminal of receiving filter 11R are connected to terminal 15b of switch 15E. The output terminal of transmission filter 55T and the input terminal of receiving filter 55R are connected to terminal 15c of switch 15E. The output terminal of transmission filter 16T and the input terminal of receiving filter 16R are connected to terminal 15d of switch 15E. The output terminal of transmission filter 56T and the input terminal of receiving filter 56R are connected to terminal 15e of switch 15E.

Switch 15E includes terminal 15a (a first terminal), terminal 15f (a first terminal), and terminals 15b, 15c, 15d, and 15e, switches between connecting terminal 15a to terminal 15b and connecting terminal 15a to terminal 15c, and switches between connecting terminal 15a to terminal 15d and connecting terminal 15a to terminal 15e. Terminal 15a is connected to selection terminal 30c of switch 30, and terminal 15f is connected to selection terminal 31c of switch 31.

According to the above configuration, transfer circuit 10E transmits and receives radio frequency signals having frequency ranges in 4G-LTE Band 13 by FDD, transmits and receives radio frequency signals having frequency ranges in 4G-LTE Band 26 by FDD, transmits and receives radio frequency signals having frequency ranges in 4G-LTE Band 20 by FDD, and transmits and receives radio frequency signals having frequency ranges in 4G-LTE Band 8 by FDD. At this time, the switching of switches 14, 15E, 19, 59, and 58 allows exclusive selection from among transmission and reception of radio frequency signals having frequency ranges in 4G-LTE Band 13, and transmission and reception of radio frequency signals having frequency ranges in 4G-LTE Band 20, and allows exclusive selection from among transmission and reception of radio frequency signals having frequency ranges in 4G-LTE Band 26, and transmission and reception of radio frequency signals having frequency ranges in 4G-LTE Band 8.

Note that transfer circuit 10E may have a configuration in which instead of duplexer 55, a transmission filter having a passband that is the transmission band of 4G-LTE Band20 and a receiving filter having passbands that are the receiving band of 4G-LTE Band 20 and the receiving band of 4G-LTE Band 28 are connected to different selection terminals of switch 15E.

Radio frequency circuit 1E having such a configuration can improve isolation when, for example, (3) simultaneously transmitting (through EN-DC) a transmission signal having a frequency range in 4G-LTE Band 20 using transfer circuit 10E, and a transmission signal having a frequency range in 5G-NR n8 using transfer circuit 20E as described below, as compared with radio frequency circuit 1E in which duplexer 55 is disposed.

Transfer circuit 20E is an example of a second transfer circuit, and transfers radio frequency signals having frequency ranges in 5G-NR n26 (a second communication band), and radio frequency signals having frequency ranges in 5G-NR n8 (a fifth communication band). Furthermore, transfer circuit 20E transfers a reception signal having a frequency range in 5G-NR n13, and a reception signal having a frequency range in 5G-NR n20. Transfer circuit 20E includes transmission input terminal 220, reception output terminal 230, duplexers 21 and 61, receiving filters 26R and 66R, power amplifier 62T, low noise amplifiers 62R and 67R, and switches 23E, 25E, 28E, and 69.

The output terminal of transmission filter 21T and the input terminal of receiving filter 21R are connected to terminal 25d of switch 25E, the input terminal of transmission filter 21T is connected to terminal 23a of switch 23E, and the output terminal of receiving filter 21R is connected to terminal 28d of switch 28E.

The output terminal of transmission filter 61T and the input terminal of receiving filter 61R are connected to terminal 25e of switch 25E, the input terminal of transmission filter 61T is connected to terminal 23b of switch 23E, and the output terminal of receiving filter 61R is connected to terminal 28e of switch 28E.

Receiving filter 26R allows a reception signal having a frequency range in 5G-NR n13 to pass through. The input terminal of receiving filter 26R is connected to terminal 25b of switch 25E, and the output terminal of receiving filter 26R is connected to terminal 28a of switch 28E. Receiving filter 26R has a passband that is the reception band of 5G-NR n13 (the first reception band).

Receiving filter 66R allows a reception signal having a frequency range in 5G-NR n20 to pass through. The input terminal of receiving filter 66R is connected to terminal 25c of switch 25E, and the output terminal of receiving filter 66R is connected to terminal 28b of switch 28E. Receiving filter 66R has a passband that is the reception band of 5G-NR n20 (a fourth reception band).

Power amplifier 62T is an example of a second power amplifier, and amplifies transmission signals having frequency ranges in the transmission bands of 5G-NR n26 and n8 and input through transmission input through terminal 220. Power amplifier 62T is connected between transmission input terminal 220 and switch 23E.

Low noise amplifier 62R amplifies reception signals having frequency ranges in the receiving bands of 5G-NR n13 and n20 and input via switch 25E. Low noise amplifier 62R is connected between switch 28E and switch 69.

Low noise amplifier 67R amplifies reception signals having frequency ranges in the receiving bands of 5G-NR n20 and n8 and input via switch 25E. Low noise amplifier 67R is connected between switch 28E and switch 69.

Switch 25E includes terminal 25a (a second terminal), terminal 25f (a second terminal), and terminals 25b, 25c, 25d, and 25e, switches between connecting terminal 25a to terminal 25b and connecting terminal 25a to terminal 25c, and switches between connecting terminal 25a to terminal 25d and connecting terminal 25a to terminal 25e. Terminal 25a is connected to selection terminal 31d of switch 31, and terminal 25f is connected to selection terminal 30d of switch 30.

Switch 23E includes terminal 23c, and terminals 23a and 23b, and switches between connecting terminal 23c to terminal 23a and connecting terminal 23c to terminal 23b. Terminal 23c is connected to the output terminal of power amplifier 62T.

Switch 28E includes terminals 28c and 28f and terminals 28a, 28b, 28d, and 28e, switches between connecting terminal 28c to terminal 28a and connecting terminal 28c to terminal 28b, and switches between connecting terminal 28f to terminal 28d and connecting terminal 28f to terminal 28e. Terminal 28c is connected to the input terminal of low noise amplifier 62R, and terminal 28f is connected to the input terminal of low noise amplifier 67R.

Switch 69 is disposed between reception output terminal 130 and low noise amplifiers 62R and 67R, and switches between connecting reception output terminal 230 to low noise amplifier 62R and connecting reception output terminal 230 to low noise amplifier 67R.

According to the above configuration, transfer circuit 20E transmits and receives radio frequency signals having frequency ranges in 5G-NR n26 by FDD, and transmits and receives radio frequency signals having frequency ranges in 5G-NR n8 by FDD, receives a radio frequency signal having a frequency range in 5G-NR n13, and receives a radio frequency signal having a frequency range in 5G-NR n20. At this time, the switching of switches 23E, 25E, 28E, and 69 allows exclusive selection from among transmission and reception of radio frequency signals having frequency ranges in 5G-NR n26, and transmission and reception of radio frequency signals having frequency ranges in 5G-NR n8, and reception of a radio frequency signal having a frequency range in 5G-NR n13, and reception of a radio frequency signal having a frequency range in 5G-NR n20.

Antenna circuit 5E includes antennas 51, 52, 53, and 54. Antennas 51 to 54 radiate and receive radio frequency signals.

Switch 30 includes antenna terminal 30a (a first antenna terminal), antenna terminal 30b (a second antenna terminal), selection terminal 30c (a first selection terminal), and selection terminal 30d (a second selection terminal). Antenna terminal 30a is connected to antenna 51, and antenna terminal 30b is connected to antenna 52. Selection terminal 30c is connected to terminal 15a of transfer circuit 10E, and selection terminal 30d is connected to terminal 25f of transfer circuit 20E.

Switch 31 includes antenna terminals 31a and 31b, and selection terminals 31c and 31d. Antenna terminal 31a is connected to antenna 53, and antenna terminal 31b is connected to antenna 54. Selection terminal 31c is connected to terminal 15f of transfer circuit 10E, and selection terminal 31d is connected to terminal 25a of transfer circuit 20E.

Here, transfer circuit 10E and transfer circuit 20E are mounted on different mounting boards in radio frequency circuit 1E according to this example.

The passband of duplexer 16 (4G-LTE Band 26) and the passband of duplexer 21 (5G-NR n26) have the same frequency range. The passband of duplexer 56 (4G-LTE Band 8) and the passband of duplexer 61 (5G-NR n8) have the same frequency range. The receiving band of duplexer 11 (4G-LTE Band 13-Rx) and the receiving band of receiving filter 26R (5G-NR n13-Rx) have the same frequency range. The receiving band of duplexer 55 (4G-LTE Band 20-Rx) and the receiving band of receiving filter 66R (5G-NR n20-Rx) have the same frequency range.

Radio frequency circuit 1E having the above configuration can transfer 4G radio frequency signals and 5G radio frequency signals. Furthermore, radio frequency circuit 1E can (1) simultaneously transmit a transmission signal having a frequency range in 4G-LTE Band 13 using transfer circuit 10E, and a transmission signal having a frequency range in 5G-NR n26 using transfer circuit 20E (through EN-DC), (2) simultaneously transmit a transmission signal having a frequency range in 4G-LTE Band 26 using transfer circuit 10E, and a transmission signal having a frequency range in 5G-NR n26 using transfer circuit 20E (through EN-DC), (3) simultaneously transmit a transmission signal having a frequency range in 4G-LTE Band 20 using transfer circuit 10E, and a transmission signal having a frequency range in 5G-NR n8 using transfer circuit 20E (through EN-DC), and (4) simultaneously transmit a transmission signal having a frequency range in 4G-LTE Band 8 using transfer circuit 10E, and a transmission signal having a frequency range in 5G-NR n8 using transfer circuit 10E (through EN-DC). Furthermore, radio frequency circuit 1E can receive a reception signal having a frequency range in 5G-NR n13 using transfer circuit 20E simultaneously with (1) above, and receive a reception signal having a frequency range in 5G-NR n20 using transfer circuit 20E simultaneously with (3) above.

Here, transfer circuit 20E includes low noise amplifier 62R that amplifies a reception signal having a frequency range in the receiving band of 5G-NR n13, and does not include a power amplifier that amplifies a transmission signal having the transmission band of 5G-NR n13. Further, transfer circuit 20E includes low noise amplifier 62R that amplifies a reception signal having a frequency range in the receiving band of 5G-NR n20, and does not include a power amplifier that amplifies a transmission signal having a frequency range in the transmission band of 5G-NR n20.

According to this, transfer circuit 10E has both the transmission and reception paths for 4G-LTE Band 13, whereas transfer circuit 20E has only the reception path for 5G-NR n13 out of the transmission and reception paths therefor. Further, transfer circuit 10E has both the transmission and reception paths for 4G-LTE Band 20, whereas transfer circuit 20E has only the reception path for 5G-NR n20 out of the transmission and reception paths therefor. Accordingly, intermodulation distortion that occurs due to a transmission signal transferred in transfer circuit 10E and a transmission signal transferred in transfer circuit 20E can be reduced while transfer circuit 20E is used as a diversity circuit.

Figure 8A:
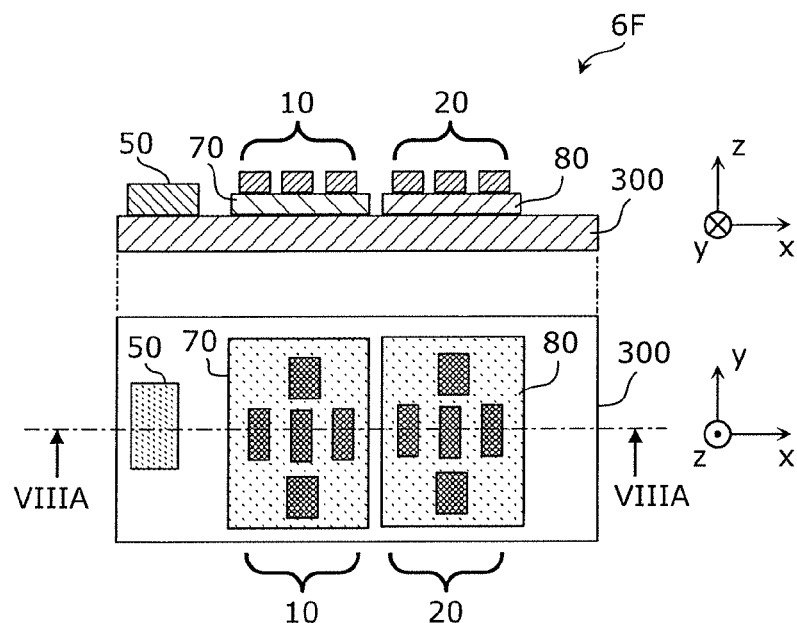
FIG. 8A illustrates a first example of a mounting configuration of a radio frequency circuit and a communication device according to the embodiment.

7 Mounting Configuration of Radio Frequency Circuit and Communication Device FIG. 8A illustrates a first example of the mounting configuration of radio frequency circuit 1 and communication device 6F according to the embodiment. FIG. 8A illustrates the cross sectional view and the top view of radio frequency circuit 1 and communication device 6F. Communication device 6F includes transfer circuits 10 and 20, antenna 50, mounting boards 70 and 80, and motherboard 300. Transfer circuit 10 is mounted on mounting board 70, and transfer circuit 20 is mounted on mounting board 80. Antenna 50, mounting board 70 on which transfer circuit 10 is mounted, and mounting board 80 on which transfer circuit 20 is mounted are mounted on motherboard 300. Motherboard 300 corresponds to the motherboard of a mobile phone, for example. According to the above configuration, transfer circuits 10 and 20 are mounted on different mounting boards 70 and 80. Accordingly, high isolation between a transmission signal transferred in transfer circuit 10 and a transmission signal transferred in transfer circuit 20 is ensured, and thus such intermodulation distortion can be reduced.

Figure 8B:
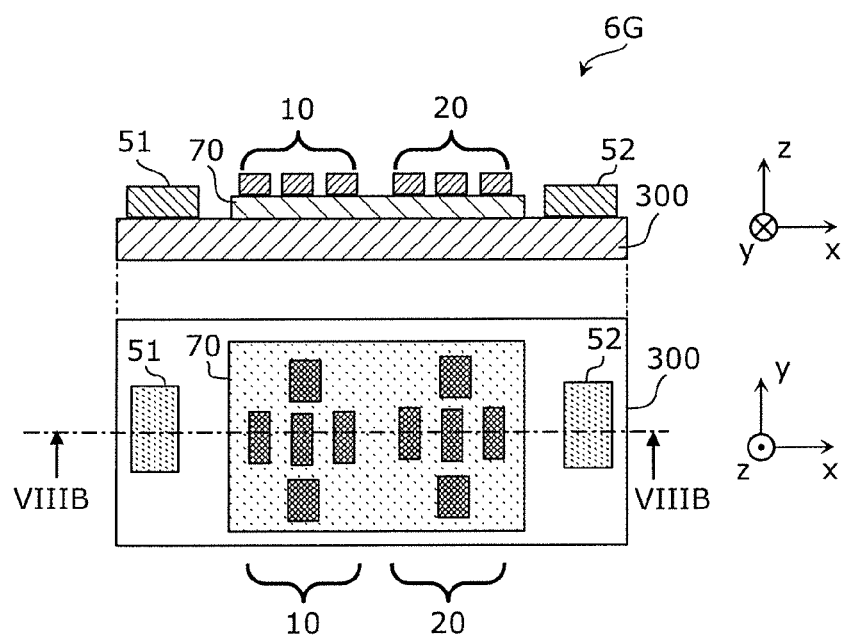
FIG. 8B illustrates a second example of a mounting configuration of a radio frequency circuit and a communication device according to the embodiment.

FIG. 8B illustrates a second example of a mounting configuration of radio frequency circuit 1 and communication device 6G according to the embodiment. FIG. 8B illustrates the cross sectional view and the top view of radio frequency circuit 1 and communication device 6G. Communication device 6G includes transfer circuits 10 and 20, antennas 51 and 52, mounting board 70, and motherboard 300. Transfer circuits 10 and 20 are mounted on mounting board 70. As illustrated in FIG. 1, transfer circuit 10 is connected to antenna 51, and transfer circuit 20 is connected to antenna 52. Antennas 51 and 52 and mounting board 70 on which transfer circuits 10 and 20 are mounted are mounted on motherboard 300. Motherboard 300 corresponds to the motherboard of a mobile phone, for example. According to the above configuration, transfer circuits 10 and 20 are mounted on different mounting boards 70 and 80. According to this, transmission signals having frequency ranges in a first communication band and a second communication band in different communication systems are simultaneously radiated from different antennas. Accordingly, high isolation between a transmission signal transferred in transfer circuit 10 and a transmission signal transferred in transfer circuit 20 is ensured, and thus such intermodulation distortion can be reduced.

Note that in communication device 6G, a resin member that covers transfer circuits 10 and 20 may be disposed on mounting board 70. Further, a shielding member may be disposed on mounting board 70 between transfer circuit 10 and transfer circuit 20. Accordingly, isolation between a transmission signal transferred in transfer circuit 10 and a transmission signal transferred in transfer circuit 20 further improves.

Note that in the radio frequency circuits according to the above embodiment and Examples 1 to 5, for example, the first communication band is 4G-LTE Band 13, and the second communication band is 5G-NRn26, but the present disclosure is not limited thereto.

For example, the first communication band may be 4G-LTE Band 26 and the second communication band may be 5G-NR n13.

Thus, one of the first communication band and the second communication band may be communication band 26, and the other of the first communication band and the second communication band may be communication band 13.

Further, one the first communication band and the second communication band may be communication band 13 or communication band 14 (having a transmission band from 788 MHz to 798 MHz, and a receiving band from 758 MHz to 768 MHz), and the other of the first communication band and the second communication band may be one of communication band 26, communication band 18 (having a transmission band from 815 MHz to 830 MHz, and a receiving band from 860 MHz to 875 MHz), communication band 19 (having a transmission band from 830 MHz to 845 MHz, and a receiving band from 875 MHz to 890 MHz), and communication band 27 (having a transmission band from 807 MHz to 824 MHz, and a receiving band from 852 MHz to 869 MHz).

Further, one of the first communication band and the second communication band may be communication band 20, and the other of the first communication band and the second communication band may be communication band 8.

Further, one of the first communication band and the second communication band may be communication band 71 (having a transmission band from 663 MHz to 698 MHz, and a receiving band from 617 MHz to 652 MHz). Note that one of the first communication band and the second communication band may be a portion of communication band 71. For example, one of the first communication band and the second communication band may be communication band 71a (having a transmission band from 663 MHz to 688 MHz, and a receiving band from 617 MHz to 642 MHz), or may be communication band 71b (having a transmission band from 673 MHz to 698 MHz, and a receiving band from 627 MHz to 652 MHz).

One of the first communication band and the second communication band may be communication band 13, and the other of the first communication band and the second communication band may be communication band 26, whereas one of the fourth communication band and the fifth communication band may be communication band 20, and the other of the fourth communication band and the fifth communication band may be communication band 8.

8 Advantageous Effects

As described above, according to the above embodiment, radio frequency circuit 1 configured to transfer a radio frequency signal used in a first communication system, and a radio frequency signal used in a second communication system different from the first communication system includes: transfer circuit 10 (a first transfer circuit) configured to transfer a radio frequency signal having a frequency range in a first communication band, the first communication band having a first transmission band and a first receiving band; and transfer circuit 20 (a second transfer circuit) configured to transfer a radio frequency signal having a frequency range in a second communication band, the second communication band having a second transmission band and a second receiving band. Radio frequency circuit 1 is configured to simultaneously transmit a transmission signal having a frequency range in the first communication band using transfer circuit 10, and a transmission signal having a frequency range in the second communication band using transfer circuit 20, the first communication band being in one communication system out of the first communication system and the second communication system, the second communication band being in another communication system out of the first communication system and the second communication system. The first receiving band is lower than the first transmission band, the first transmission band is lower than the second transmission band, and the second transmission band is lower than the second receiving band. Transfer circuit 10 and transfer circuit 20 are mounted on different mounting boards.

When radio frequency signals having frequency ranges in the first communication band and the second communication band in different communication systems which are in a relation in which transmission bands are adjacent to each other without a receiving band being located therebetween are simultaneously transmitted, frequencies of spurious emissions that cause intermodulation distortion may overlap the first communication band and/or the second communication band since the transmission bands are adjacent to each other. In this case, the receiving sensitivity to a radio frequency signal having a frequency range in the first/second communication band falls.

To address this, according to the above configuration, radio frequency signals having frequency ranges in the first communication band and the second communication band in different communication systems are simultaneously transmitted by transfer circuits 10 and 20 mounted on different mounting boards. Accordingly, high isolation between a transmission signal transferred in transfer circuit 10 and a transmission signal transferred in transfer circuit 20 is ensured, and thus such intermodulation distortion can be reduced.

Further, ($2 \times f2 - f1$) may fall within the second receiving band or ($2 \times f1 - f2$) may fall within the first receiving band, where f1 denotes a frequency of a transmission signal in the first communication band transmitted by transfer circuit 10, and f2 denotes a frequency of a transmission signal in the second communication band transmitted by transfer circuit 20.

According to this, when radio frequency signals having frequency ranges in the first communication band and the second communication band are transmitted simultaneously, frequencies of spurious emissions that cause third-order intermodulation distortion may overlap the receiving band(s) of the first communication band and/or the second communication band.

To address this, according to the above configuration, high isolation between a transmission signal transferred in transfer circuit 10 and a transmission signal transferred in transfer circuit 20 is ensured, and thus such third-order intermodulation distortion can be reduced.

Transfer circuit 10 may include: power amplifier 12T configured to amplify a transmission signal having a frequency range in the first transmission band; and transmission reception terminal 110 through which the transmission signal amplified by power amplifier 12T is output. Transfer circuit 20 may include: power amplifier 22T configured to amplify a transmission signal having a frequency range in the second transmission band; and transmission reception terminal 210 through which the transmission signal amplified by power amplifier 22T is output. Transmission reception terminals 110 and 210 may be connected to different antennas 51 and 52.

Accordingly, a radio frequency signal having a frequency range in the first communication band and output from transfer circuit 10 and a radio frequency signal having a frequency range in the second communication band and output from transfer circuit 20 are radiated by different antennas, and thus isolation between the two radio frequency signals can be improved, and such intermodulation distortion can be further reduced.

Radio frequency circuits 1A to 1E may each further include: switch 30 that includes: antenna terminal 30a connected to antenna 51; antenna terminal 30b connected to antenna 52 different from antenna 51; selection terminal 30c; and selection terminal 30d. Switch 30 may be configured to: switch between connecting antenna terminal 30a to selection terminal 30c and connecting antenna terminal 30a to selection terminal 30d; and switch between connecting antenna terminal 30b to selection terminal 30c and connecting antenna terminal 30b to selection terminal 30d. The transmission reception terminal of transfer circuit 10 may be connected to selection terminal 30c, and may be connected to antenna 51 or 52 via switch 30, and the transmission reception terminal of transfer circuit 20 may be connected to selection terminal 30d, and may be connected to antenna 51 or 52 via switch 30.

Accordingly, switch 30 can switch between connecting transfer circuit 10 to antenna 51 and connecting transfer circuit 20 to antenna 52, based on the state of an antenna such as antenna sensitivity. Accordingly, the communication quality of radio frequency circuits 1A to 1E can be improved.

In each of radio frequency circuits 1A to 1E, the first transfer circuit may be further configured to transfer a radio frequency signal having a frequency range in a third communication band different from the first communication band, and the third communication band may at least partially overlap the second communication band.

Accordingly, radio frequency signals having partially overlapping frequency ranges in the second communication band and the third communication band can be separately transferred by the second transfer circuit and the first transfer circuit mounted on different mounting boards. Thus, a radio frequency signal having a frequency range in the third communication band and transferred in the first transfer circuit and a radio frequency signal having a frequency range in the second communication band and transferred in the second transfer circuit can be simultaneously transferred while high isolation therebetween is ensured.

In radio frequency circuit 1B, the third communication band may have a third transmission band and a third receiving band, and transfer circuit 10B may include: low noise amplifier 12R configured to amplify a reception signal having a frequency range in the first receiving band and transferred in transfer circuit 10B; and low noise amplifier 17R configured to amplify a reception signal having a frequency range in the third receiving band and transferred in transfer circuit 10B, and a reception signal having a frequency range in the second receiving band and transferred in transfer circuit 20B.

Accordingly, low noise amplifier 17R included in transfer circuit 10B amplifies a reception signal having a frequency range in the second receiving band and transferred in transfer circuit 20B, and thus transfer circuit 20B does not need to include a low noise amplifier that amplifies a reception signal having a frequency range in the second receiving band. Accordingly, the low noise amplifier can be excluded, and thus radio frequency circuit 1B can be miniaturized.

The first transfer circuit may be configured to transfer a radio frequency signal used in a fourth generation mobile communication system (4G), and the second transfer circuit may be configured to transfer a radio frequency signal used in a fifth generation mobile communication system (5G).

Accordingly, 4G and 5G radio frequency signals can be transferred simultaneously (through EN-DC) while intermodulation distortion that occurs due to the 4G and 5G radio frequency signals.

One of the first communication band and the second communication band may be communication band 13 or communication band 14, and another of the first communication band and the second communication band may be one of communication band 26, communication band 18, communication band 19, and communication band 27.

One of the first communication band and the second communication band may be communication band 20, and another of the first communication band and the second communication band may be communication band 8.

One of the first communication band and the second communication band may be communication band 71.

In each of radio frequency circuits 1C to 1E, the first transfer circuit may include: a first power amplifier (power amplifier 12T or 52T) configured to amplify a transmission signal having a frequency range in the first transmission band; and a first low noise amplifier (low noise amplifier 12R or 52R) configured to amplify a reception signal having a frequency range in the first receiving band, and the second transfer circuit may include: a fourth low noise amplifier (low noise amplifier 27R or 62R) configured to amplify a reception signal having a frequency range in the first receiving band; and no power amplifier configured to amplify a transmission signal having a frequency range in the first transmission band.

According to this, the first transfer circuit has both the transmission and reception paths for the first communication band, whereas the second transfer circuit has only the reception path for the first communication band out of the transmission and reception paths therefor. Accordingly, intermodulation distortion that occurs due to a transmission signal transferred in the first transfer circuit and a transmission signal transferred in the second transfer circuit can be reduced while the second transfer circuit is used as a diversity circuit.

In each of radio frequency circuits 1D and 1E, the first transfer circuit may be configured to transfer a radio frequency signal having a frequency range in the first communication band, and a radio frequency signal having a frequency range in a fourth communication band, the fourth communication band having a fourth transmission band and a fourth receiving band. The second transfer circuit may be configured to transfer a radio frequency signal having a frequency range in the second communication band, and a radio frequency signal having a frequency range in a fifth communication band, the fifth communication band having a fifth transmission band and a fifth receiving band. The radio frequency circuit may be configured to: simultaneously transmit a transmission signal having a frequency range in the first communication band in one communication system out of the first communication system and the second communication system using the first transfer circuit, and a transmission signal having a frequency range in the second communication band in another communication system out of the first communication system and the second communication system using the second transfer circuit; and simultaneously transmit a transmission signal having a frequency range in the fourth communication band in the one communication system using the first transfer circuit, and a transmission signal having a frequency range in the fifth communication band in the other communication system using the second transfer circuit. The first receiving band may be lower than the first transmission band, the first transmission band may be lower than the second transmission band, and the second transmission band may be lower than the second receiving band. The fourth receiving band may be lower than the fourth transmission band, the fourth transmission band may be lower than the fifth transmission band, and the fifth transmission band may be lower than the fifth receiving band. The first transfer circuit and the second transfer circuit may be mounted on different mounting boards.

When radio frequency signals having frequency ranges in the fourth and fifth communication bands in different communication systems which are in a relation in which transmission bands are adjacent to each other without a receiving band being located therebetween are simultaneously transmitted, frequencies of spurious emissions that cause intermodulation distortion may overlap the receiving band(s) of the fourth communication band and/or the fifth communication band since the transmission bands are adjacent to each other. In this case, the receiving sensitivity to a radio frequency signal having a frequency range in the fourth/fifth communication band falls.

To address this, according to the above configuration, radio frequency signals having frequency ranges in the first communication band and the second communication band in different communication systems are simultaneously transmitted by the first transfer circuit and the second transfer circuit mounted on different mounting boards. Further, radio frequency signals having frequency ranges in the fourth communication band and the fifth communication band in different communication systems are simultaneously transmitted by the first transfer circuit and the second transfer circuit mounted on different mounting boards. Accordingly, high isolation between a transmission signal transferred in the first transfer circuit and a transmission signal transferred in the second transfer circuit is ensured, and thus such intermodulation distortion as described above can be reduced.

One of the first communication band and the second communication band may be communication band 13, another of the first communication band and the second communication band may be communication band 26, one of the fourth communication band and the fifth communication band may be communication band 20, and another of the fourth communication band and the fifth communication band may be communication band 8.

Communication device 6 includes: RFIC 3 configured to process a radio frequency signal to be transmitted by an antenna and a radio frequency signal received by the antenna; and radio frequency circuit 1 configured to transfer the radio frequency signals between the antenna and RFIC 3.

Accordingly, this provides communication device 6 in which intermodulation distortion is reduced when radio frequency signals used in a plurality of communication systems are transferred simultaneously.

The above has described a radio frequency circuit and a communication device according to the present disclosure based on the embodiment and the examples, yet the radio frequency circuit and the communication device according to the present disclosure are not limited to the above embodiment and examples. The present disclosure also encompasses another embodiment achieved by combining arbitrary elements in the embodiment and the examples, variations as a result of adding, to the embodiment and the examples, various modifications that may be conceived by those skilled in the art without departing from the scope of the present disclosure, and various devices that include the radio frequency circuit and the communication device according to the embodiment and the examples.

For example, in the above embodiment, transfer circuit 10 and transfer circuit 20 are mounted on different mounting boards, yet when transfer circuit 10 and transfer circuit 20 are connected to different antennas, transfer circuit 10 and transfer circuit 20 may not be mounted on different mounting boards.

A radio frequency circuit configured to transfer a radio frequency signal used in a first communication system, and a radio frequency signal used in a second communication system includes: a first transfer circuit configured to transfer a radio frequency signal having a frequency range in a first communication band, the first communication band having a first transmission band and a first receiving band; and a second transfer circuit configured to transfer a radio frequency signal having a frequency range in a second communication band, the second communication band having a second transmission band and a second receiving band. The radio frequency circuit is configured to simultaneously transmit a transmission signal having a frequency range in the first communication band using the first transfer circuit, and a transmission signal having a frequency range in the second communication band using the second transfer circuit, the first communication band being in one communication system out of the first communication system and the second communication system, the second communication band being in another communication system out of the first communication system and the second communication system. The first receiving band is lower than the first transmission band, the first transmission band is lower than the second transmission band, and the second transmission band is lower than the second receiving band. The first transfer circuit includes: a first power amplifier configured to amplify a transmission signal having a frequency range in the first transmission band; and a first terminal through which the transmission signal amplified by the first power amplifier is output. The second transfer circuit includes: a second power amplifier configured to amplify a transmission signal having a frequency range in the second transmission band; and a second terminal through which the transmission signal amplified by the second power amplifier is output. The first terminal and the second terminal are connected to different antennas.

When radio frequency signals having frequency ranges in the first and second communication bands in different communication systems which are in a relation in which transmission bands are adjacent to each other without a receiving band being located therebetween are simultaneously transmitted, frequencies of spurious emissions that cause intermodulation distortion may overlap the receiving band(s) of the first communication band and/or the second communication band since the transmission bands are adjacent to each other. In this case, receiving sensitivity to a radio frequency signal having a frequency range in the first/second communication band falls.

To address this, according to the above configuration, transmission signals having frequency ranges in the first communication band and the second communication band in different communication systems are radiated simultaneously from different antennas. Accordingly, high isolation between a transmission signal transferred in the first transfer circuit and a transmission signal transferred in the second transfer circuit is ensured, and thus such intermodulation distortion as described above can be reduced.

For example, in the radio frequency circuit and the communication device according to the embodiment and the examples, another radio frequency circuit element, for instance, may be disposed between circuit elements disclosed in the drawings, and another line, for instance, may be disposed between paths connecting signal paths disclosed in the drawings.

The controller according to the present disclosure may be achieved as an integrated circuit or a large-scale integrated circuit (LSI). Further, the method of circuit integration may be implemented using a dedicated circuit or a general-purpose processor. A field programmable gate array (FPGA) that allows programming after LSI manufacturing or a reconfigurable processor that allows reconfiguration of the connections and settings of the circuit cells inside the LSI may also be used. In addition, depending on the emergence of circuit integration technology that replaces LSI due to progress in semiconductor technology or other derivative technology, such technology may of course be used to integrate the function blocks.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

The present disclosure can be widely used for communication apparatuses such as a mobile phone, as a radio frequency circuit and a communication device that simultaneously transfer radio frequency signals used in two or more different communication systems.

What is claimed is:

1. A radio frequency circuit configured to transfer a radio frequency signal used in a first communication system, and a radio frequency signal used in a second communication system, the second communication system being different from the first communication system, the radio frequency circuit comprising:
a first transfer circuit configured to transfer a radio frequency signal having a frequency range in a first communication band, the first communication band having a first transmission band and a first receiving band; and
a second transfer circuit configured to transfer a radio frequency signal having a frequency range in a second communication band, the second communication band having a second transmission band and a second receiving band, wherein:
the radio frequency circuit is configured to simultaneously transmit a transmission signal having a frequency range in the first communication band using the first transfer circuit, and a transmission signal having a frequency range in the second communication band using the second transfer circuit, the first communication band being in one communication system out of the first communication system and the second communication system, the second communication band being in another communication system out of the first communication system and the second communication system,
the first receiving band is lower than the first transmission band,
the first transmission band is lower than the second transmission band,
the second transmission band is lower than the second receiving band,
the first transfer circuit and the second transfer circuit are mounted on different mounting boards, and
(m×f1±n×f2) falls within the first receiving band or (m×f2±n×f1) falls within the second receiving band, where m and n are natural numbers, f1 denoting a frequency of a transmission signal in the first communication band transmitted by the first transfer circuit, and f2 denoting a frequency of a transmission signal in the second communication band transmitted by the second transfer circuit.

2. The radio frequency circuit according to claim 1, wherein m equals 2 and n equals 1 such that (2×f2−f1) falls within the second receiving band or (2×f1−f2) falls within the first receiving band.

3. The radio frequency circuit according to claim 1, wherein:
the first transfer circuit is configured to transfer a radio frequency signal used in a fourth generation mobile communication system (4G), and
the second transfer circuit is configured to transfer a radio frequency signal used in a fifth generation mobile communication system (5G).

4. The radio frequency circuit according to claim 1, wherein:
the first communication band or the second communication band is communication band 13 or communication band 14, and
the other of the first communication band or the second communication band is communication band 26, communication band 18, communication band 19, or communication band 27.

5. The radio frequency circuit according to claim 1, wherein:
the first communication band or the second communication band is communication band 20, and
the other of the first communication band or the second communication band is communication band 8.

6. The radio frequency circuit according to claim 1, wherein the first communication band or the second communication band is communication band 71.

7. The radio frequency circuit according to claim 1, wherein:
the first transfer circuit comprises:
a first power amplifier configured to amplify a transmission signal having a frequency range in the first transmission band; and
a first low noise amplifier configured to amplify a reception signal having a frequency range in the first receiving band,
the second transfer circuit comprises:
a fourth low noise amplifier configured to amplify a reception signal having a frequency range in the first receiving band, and the second transfer circuit does not comprise a power amplifier configured to amplify a transmission signal having a frequency range in the first transmission band.

8. The radio frequency circuit according to claim 1, wherein:
the first transfer circuit is configured to transfer a radio frequency signal having a frequency range in the first communication band, and to transfer a radio frequency signal having a frequency range in a fourth communication band, the fourth communication band having a fourth transmission band and a fourth receiving band,
the second transfer circuit is configured to transfer a radio frequency signal having a frequency range in the second communication band, and to transfer a radio frequency signal having a frequency range in a fifth communication band, the fifth communication band having a fifth transmission band and a fifth receiving band,
the radio frequency circuit is configured to:
simultaneously transmit a transmission signal having a frequency range in the first communication band in the one communication system using the first transfer circuit, and a transmission signal having a frequency range in the second communication band in the other communication system using the second transfer circuit; and
simultaneously transmit a transmission signal having a frequency range in the fourth communication band in the one communication system using the first transfer circuit, and a transmission signal having a frequency range in the fifth communication band in the other communication system using the second transfer circuit,
the first receiving band is lower than the first transmission band,
the first transmission band is lower than the second transmission band,
the second transmission band is lower than the second receiving band,
the fourth receiving band is lower than the fourth transmission band,
the fourth transmission band is lower than the fifth transmission band,
the fifth transmission band is lower than the fifth receiving band, and
the first transfer circuit and the second transfer circuit are mounted on the different mounting boards.

9. The radio frequency circuit according to claim 8, wherein
the first communication band or the second communication band is communication band 13,
the other of the first communication band or the second communication band is communication band 26,
the fourth communication band or the fifth communication band is communication band 20, and
the other of the fourth communication band or the fifth communication band is communication band 8.

10. A communication device, comprising:
a radio frequency (RF) signal processing circuit configured to process radio frequency signals for transmission by an antenna, and radio frequency signals received by the antenna; and
the radio frequency circuit according to claim 1 configured to transfer the radio frequency signals between the antenna and the RF signal processing circuit.

11. The radio frequency circuit according to claim 1, wherein m equals 1 and n equals 1 such that (f2−f1) falls within the second receiving band or (f1−f2) falls within the first receiving band.

12. A radio frequency circuit configured to transfer a radio frequency signal used in a first communication system, and a radio frequency signal used in a second communication system, the second communication system being different from the first communication system, the radio frequency circuit comprising:
a first transfer circuit configured to transfer a radio frequency signal having a frequency range in a first communication band, the first communication band having a first transmission band and a first receiving band; and
a second transfer circuit configured to transfer a radio frequency signal having a frequency range in a second communication band, the second communication band having a second transmission band and a second receiving band, wherein:
the radio frequency circuit is configured to simultaneously transmit a transmission signal having a frequency range in the first communication band using the first transfer circuit, and a transmission signal having a frequency range in the second communication band using the second transfer circuit, the first communication band being in one communication system out of the first communication system and the second communication system, the second communication band being in another communication system out of the first communication system and the second communication system,
the first receiving band is lower than the first transmission band,
the first transmission band is lower than the second transmission band,
the second transmission band is lower than the second receiving band, and
the first transfer circuit and the second transfer circuit are mounted on different mounting boards,
the first transfer circuit comprises:
a first power amplifier configured to amplify a transmission signal having a frequency range in the first transmission band; and
a first terminal through which the transmission signal amplified by the first power amplifier is output,
the second transfer circuit comprises:
a second power amplifier configured to amplify a transmission signal having a frequency range in the second transmission band; and
a second terminal through which the transmission signal amplified by the second power amplifier is output, and
the first terminal and the second terminal are connected to different antennas,
a switch circuit that comprises:
a first antenna terminal connected to a first antenna;
a second antenna terminal connected to a second antenna, the second antenna being different from the first antenna;
a first selection terminal; and
a second selection terminal,
wherein the switch circuit is configured to:
selectively switch connection of the first antenna terminal between the first selection terminal and the second selection terminal; and selectively switch connection of the second antenna terminal between the first selection terminal and the second selection terminal, the first terminal is connected to the first selection terminal, and is connected to the first antenna or the second antenna via the switch circuit, and the second terminal is connected to the second selection terminal, and is connected to the first antenna or the second antenna via the switch circuit.

13. A radio frequency circuit configured to transfer a radio frequency signal used in a first communication system, and a radio frequency signal used in a second communication system, the second communication system being different from the first communication system, the radio frequency circuit comprising:

a first transfer circuit configured to transfer a radio frequency signal having a frequency range in a first communication band, the first communication band having a first transmission band and a first receiving band; and a second transfer circuit configured to transfer a radio frequency signal having a frequency range in a second communication band, the second communication band having a second transmission band and a second receiving band, wherein:

the radio frequency circuit is configured to simultaneously transmit a transmission signal having a frequency range in the first communication band using the first transfer circuit, and a transmission signal having a frequency range in the second communication band using the second transfer circuit, the first communication band being in one communication system out of the first communication system and the second communication system, the second communication band being in another communication system out of the first communication system and the second communication system, the first receiving band is lower than the first transmission band, the first transmission band is lower than the second transmission band, the second transmission band is lower than the second receiving band, and the first transfer circuit and the second transfer circuit are mounted on different mounting boards, the first transfer circuit is further configured to transfer a radio frequency signal having a frequency range in a third communication band different from the first communication band, and the third communication band at least partially overlaps the second communication band.

14. The radio frequency circuit according to claim 13, wherein:

the third communication band comprises a third transmission band and a third receiving band, and the first transfer circuit comprises:

a first low noise amplifier configured to amplify a reception signal having a frequency range in the first receiving band and transferred in the first transfer circuit; and a third low noise amplifier configured to amplify a reception signal having a frequency range in the third receiving band and transferred in the first transfer circuit, and to amplify a reception signal having a frequency range in the second receiving band and transferred in the second transfer circuit.

* * * * *